(12) United States Patent
Dai Zovi

(10) Patent No.: US 9,483,653 B2
(45) Date of Patent: *Nov. 1, 2016

(54) SECURE DISPLAY ELEMENT

(71) Applicant: Square, Inc., San Francisco, CA (US)

(72) Inventor: Dino Dai Zovi, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/527,629

(22) Filed: Oct. 29, 2014

(65) Prior Publication Data

US 2016/0125193 A1 May 5, 2016

(51) Int. Cl.
*G06F 21/00* (2013.01)
*G06F 21/62* (2013.01)

(52) U.S. Cl.
CPC .................. *G06F 21/6209* (2013.01)

(58) Field of Classification Search
CPC ............... G06F 21/6209; G06F 21/36; G06F 3/04842; G06T 15/80
USPC ............................ 726/19; 713/150, 156, 183
See application file for complete search history.

(56) References Cited

U.S. PATENT DOCUMENTS

| | | | | |
|---|---|---|---|---|
| 5,832,206 A * | 11/1998 | De Jesus | ................. | G06F 21/31 341/26 |
| 6,543,684 B1 * | 4/2003 | White | ................. | G06F 3/04886 235/379 |
| 6,669,100 B1 * | 12/2003 | Rogers | ...................... | G07F 7/10 235/380 |
| 7,484,173 B2 | 1/2009 | Gao et al. | | |
| 2003/0182558 A1 * | 9/2003 | Lazzaro | ............. | G06Q 30/0641 713/183 |
| 2003/0235452 A1 * | 12/2003 | Kraus | ..................... | B41J 5/102 400/472 |
| 2004/0257238 A1 * | 12/2004 | De Jongh | ........... | G06F 3/04886 340/5.85 |
| 2006/0224523 A1 * | 10/2006 | Elvitigala | ........... | G06F 3/04886 705/64 |
| 2006/0242421 A1 * | 10/2006 | Hsu | ........................ | G06F 21/36 713/182 |
| 2007/0016792 A1 * | 1/2007 | Allen, Jr. | ................. | G06F 21/31 713/182 |
| 2007/0183000 A1 | 8/2007 | Eisen et al. | | |
| 2008/0060052 A1 * | 3/2008 | Hwang | .................... | G06F 21/31 726/2 |
| 2008/0110981 A1 * | 5/2008 | DeLine | ..................... | B60S 5/02 235/381 |
| 2008/0148186 A1 * | 6/2008 | Krishnamurthy | ....... | G06F 21/83 715/840 |

(Continued)

FOREIGN PATENT DOCUMENTS

WO 2016/069782 A1 5/2016

OTHER PUBLICATIONS

Notice of Allowance mailed Apr. 27, 2016, for U.S. Appl. No. 14/527,639, of Zovi, D.D., filed Oct. 29, 2014.

(Continued)

*Primary Examiner* — David García Cervetti
(74) *Attorney, Agent, or Firm* — Perkins Coie LLP

(57) ABSTRACT

Techniques for securely displaying sensitive information against attempts to capture such information via screenshots are introduced. Similar to the pieces of a puzzle, a plurality of images that collectively represent a keypad (for example) are generated and each image represents a different part of the characters. The generated images are to be displayed to a human user in a sequential fashion at at least a predetermined minimum frame rate, such that the plurality of images sequentially displayed are perceivable by the human user collectively as the keypad. In each of the plurality of images, at least a part of the characters of the keypad is disguised or concealed, and in some embodiments, to the extent that not a single character of the keypad is recognizable by a human or a machine. Not all of the plurality of images are displayed at any instant in time.

28 Claims, 15 Drawing Sheets

(56) References Cited

U.S. PATENT DOCUMENTS

| | | | |
|---|---|---|---|
| 2008/0168546 A1* | 7/2008 | Almeida | G06F 21/41 726/6 |
| 2008/0258940 A1* | 10/2008 | Ding | G06F 21/31 341/22 |
| 2009/0044282 A1* | 2/2009 | Govindaraju | G06F 21/83 726/27 |
| 2009/0254994 A1* | 10/2009 | Waterson | G06F 21/83 726/26 |
| 2010/0109920 A1* | 5/2010 | Spradling | G06F 21/36 341/23 |
| 2010/0134328 A1* | 6/2010 | Gutowitz | G06F 3/0233 341/22 |
| 2010/0180120 A1* | 7/2010 | Frenkel | G06F 21/34 713/173 |
| 2010/0262835 A1* | 10/2010 | Joffray | G06F 21/34 713/185 |
| 2011/0185319 A1* | 7/2011 | Carapelli | G06Q 20/206 715/863 |
| 2012/0042364 A1* | 2/2012 | Hebert | G06F 21/46 726/6 |
| 2012/0104090 A1* | 5/2012 | Gross | G07F 7/088 235/379 |
| 2012/0268393 A1* | 10/2012 | Lee | G06F 21/36 345/173 |
| 2012/0299831 A1* | 11/2012 | Lioy | G06F 21/36 345/168 |
| 2012/0323788 A1* | 12/2012 | Keresman, III | G06Q 30/0641 705/44 |
| 2013/0050091 A1 | 2/2013 | Ge et al. | |
| 2013/0091583 A1* | 4/2013 | Karroumi | G06F 3/0236 726/26 |
| 2013/0145475 A1* | 6/2013 | Ryu | G06F 21/31 726/26 |
| 2013/0159196 A1* | 6/2013 | DiZoglio | G06Q 20/20 705/72 |
| 2013/0162679 A1* | 6/2013 | Kim | B60R 1/00 345/634 |
| 2013/0194301 A1 | 8/2013 | Robbins et al. | |
| 2013/0207902 A1* | 8/2013 | Showering | G06F 3/04886 345/173 |
| 2014/0028566 A1* | 1/2014 | Gupta | G06F 3/023 345/168 |
| 2014/0040633 A1* | 2/2014 | Leleu | G06F 21/36 713/189 |
| 2014/0095387 A1* | 4/2014 | Colnot | G06Q 20/3227 705/44 |
| 2014/0096201 A1* | 4/2014 | Gupta | H04W 12/06 726/4 |
| 2014/0129445 A1* | 5/2014 | Yang | G06Q 20/027 705/44 |
| 2014/0188734 A1 | 7/2014 | Neuwirth | |
| 2014/0201831 A1* | 7/2014 | Yi | G06F 21/31 726/19 |
| 2014/0282204 A1* | 9/2014 | Park | G06F 3/04886 715/773 |
| 2014/0351739 A1* | 11/2014 | Leger | G06F 21/36 715/773 |
| 2015/0137944 A1* | 5/2015 | Fuerth | H04L 63/083 340/5.85 |
| 2015/0154414 A1* | 6/2015 | Pike | G06F 21/36 726/30 |
| 2015/0253925 A1* | 9/2015 | Nakao | G06F 3/04883 345/173 |
| 2015/0261968 A1* | 9/2015 | Polyachenko | G06F 21/604 715/773 |
| 2015/0371213 A1* | 12/2015 | Pike | G06Q 20/322 705/72 |
| 2016/0125181 A1 | 5/2016 | Dai Zovi | |

OTHER PUBLICATIONS

International Search Report and Written Opinion for International Application No. PCT/US2015/057876, mailed Mar. 31, 2016.
Non-Final Action mailed Feb. 1, 2016, for U.S. Appl. No. 14/527,639, of Zovi, D.D., filed Oct. 29, 2014.

* cited by examiner

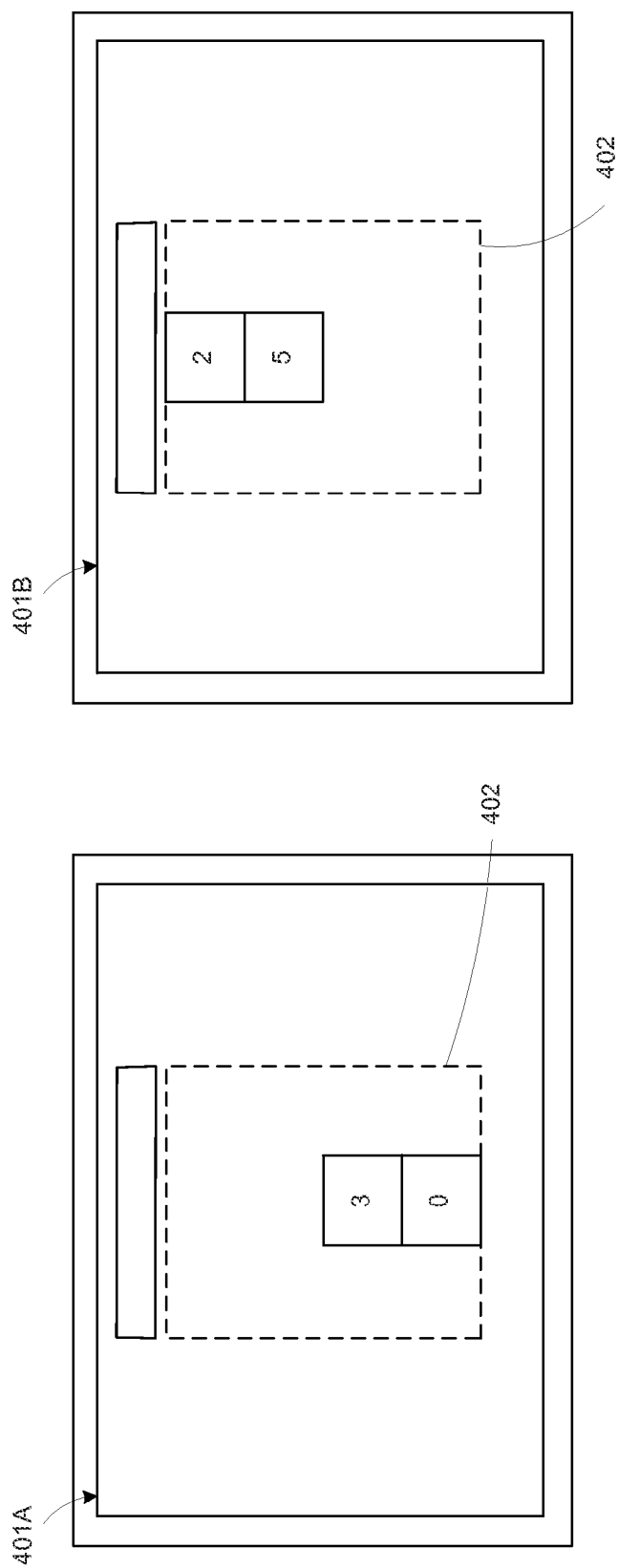

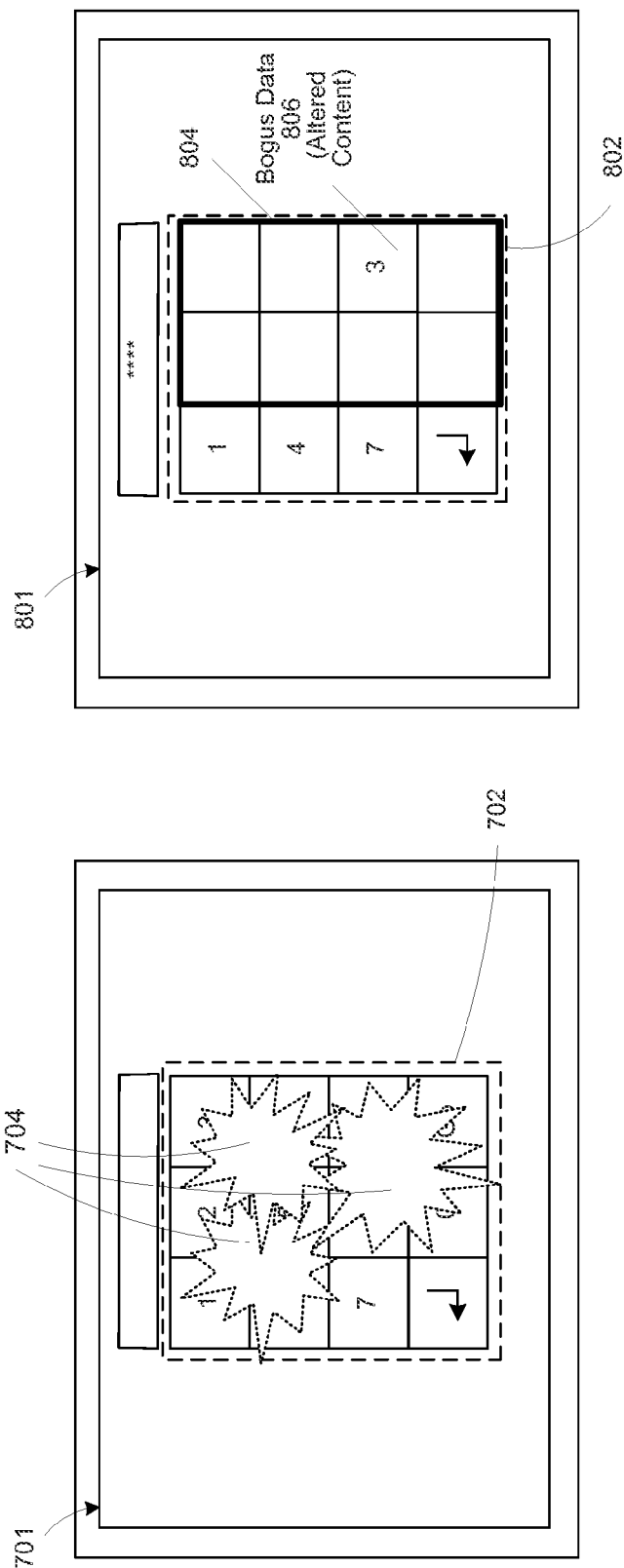

SECURE DISPLAY ELEMENT

FIELD OF THE INVENTION

This invention relates generally to computer security, and more particularly, to protecting sensitive information displayed on a computer against an unauthorized attempt to capture such information.

BACKGROUND

With the prevalence of computers and portable electronic devices, the preferred mode of information presentation has long since shifted from paper to electronic. Typically, such an electronic device is equipped with a display screen (e.g., a liquid-crystal display (LCD) screen) that presents visual information to a human user. In many instances, for example, when financial or commercial transactions are involved, sensitive information such as a social security number or bank account number may be shown on the display screen. In addition, touchscreen displays are often used to display keypads for the human user to enter sensitive data such as a secret personal identifier (e.g., a personal identification number (PIN)). This state of technology has created a vulnerability for an unscrupulous entity to install a malicious software application (e.g., on the user's computer, such as a "Trojan horse" or other malware, i.e., software designed to overcome data security measures without authorization) to take screen captures ("screenshots" or "screen-caps") of what is displayed to capture the human user's password, PIN number, or other sensitive information. Specifically, when sensitive information is displayed or when such information is entered by use of a touch-screen interface, one known type of malicious software ("malware") can take screenshots or screen-caps of a device's display screen (e.g., in response to a detected touch event) to capture the displayed information, such as passwords, social security numbers, credit card numbers or other sensitive information.

BRIEF DESCRIPTION OF THE DRAWINGS

One or more embodiments of the present invention are illustrated by way of example and not limitation in the figures of the accompanying drawings, in which like references indicate similar elements.

FIGS. 4A through 4F respectively illustrate one set of examples of images that the electronic device of FIG. 2A generates to securely display the PIN entry interface.

FIGS. 7 through 8 respectively illustrate two additional examples of screenshots, each showing a different technique for an electronic device to securely display a PIN entry interface.

DETAILED DESCRIPTION

Figure 1:
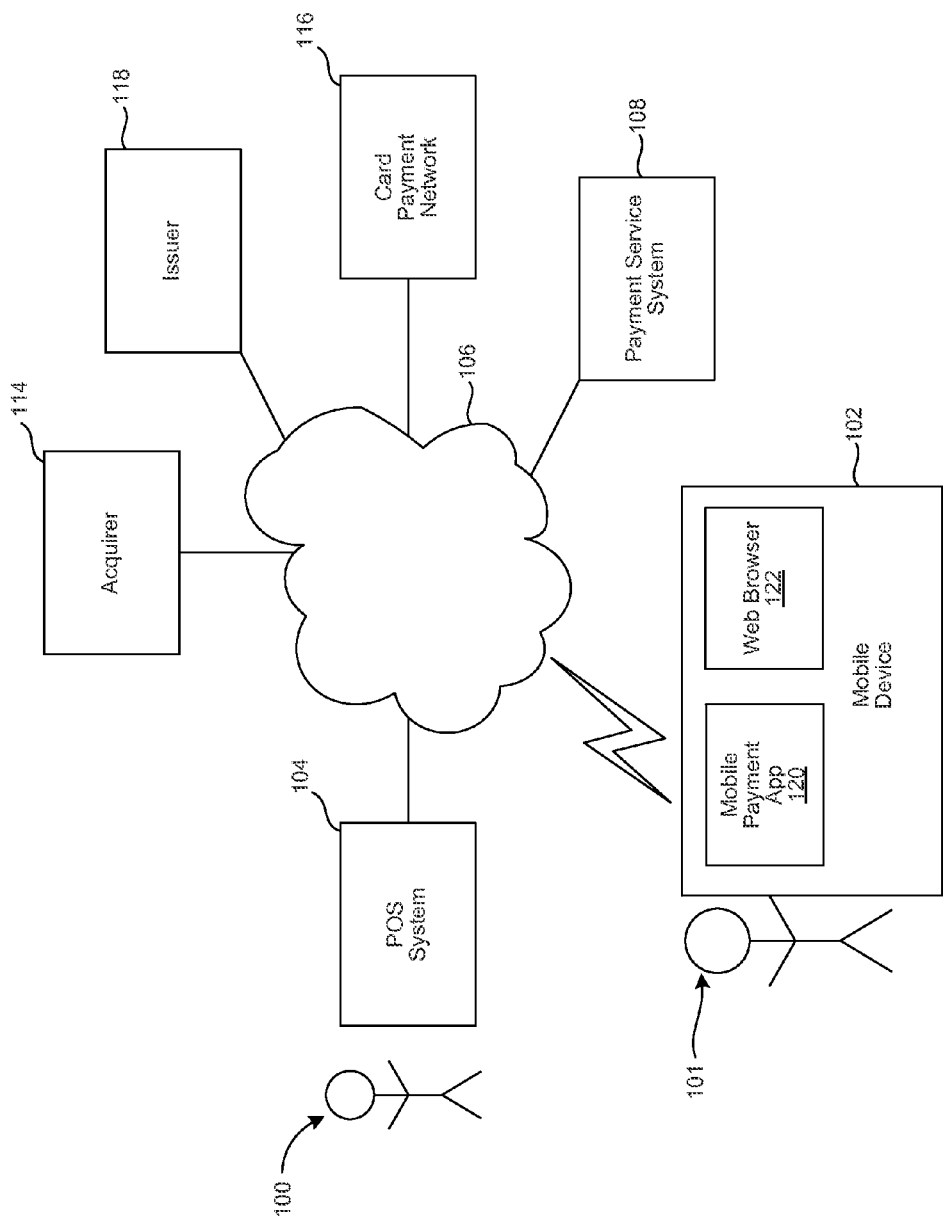
FIG. 1 illustrates an environment within which the secure display element techniques introduced here can be implemented.

References in this description to "an embodiment," "one embodiment," or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Traditionally, when a touch screen is utilized (e.g., in an automatic teller machine (ATM)) to input sensitive data such as a secret personal identifier or a PIN, there is a risk that unauthorized parties will be able to obtain the numerals of the PIN. For example, because ATMs are publicly accessible, it may be possible for such parties to clean the touch screen prior to a particular target PIN entry and then analyze the fingermarks on the touch pad afterwards to determine the locations of the PIN entry touches and thus the numerals of the entered PIN. Nonetheless, it is possible to randomize the positions of the digits on a displayed PIN pad to prevent or defeat such attack on ATMs. With the prevalence of personal and mobile computing devices, many transactions that involve sensitive information or passcode entry are now conducted online and/or through personal mobile devices; because these devices are typically not subject to physical inspection by unscrupulous parties either immediately before or after the transactions, these personal devices are less susceptible to this attack method of analyzing PIN locations by fingermarks.

On the other hand, even without physical access to the victim's personal computing devices, when sensitive information is displayed or when such information is entered by use of a touch-screen interface, one known type of malicious software ("malware") can take screenshots or screen-caps of a device's display screen (e.g., in response to a detected touch event) to capture the displayed information, such as passwords, social security numbers, credit card numbers or other sensitive information. Typical users, such as customers and merchants, are particularly susceptible to this screen-capture type of attack with the ever increasing involvement of computing devices (e.g., tablet computers or smart phones) in financial transactions. This is at least partly because these devices typically share the same or similar operating system environment—the same operating systems that are used to handle not only these financial transactions but, in many instances, day-to-day computing and communications functions such as electronic mailing, web browsing, gaming and/or other entertainments. Among other reasons, the multi-tasking role of these operating systems has created a large opportunity for unscrupulous parties to install malware (e.g., by tricking the users to download the malware) onto the victims' computers to steal sensitive information. Accordingly, there is a need for techniques that protect sensitive information or PIN pads displayed on a computer device against attempts to capture such information or keyed PINs by another software application (i.e., a malware) running on the same or another computer.

Notably, merely randomizing the digits or injecting noise to obscure the sensitive information, such as using a "Completely Automated Public Turing test to tell Computers and Humans Apart (CAPTCHA)" style mechanism (which relies on complicated static images to disguise information in ways cognizable by humans but not machines), may not be effective at defeating this screen-capture type of attack. By inspecting the screenshots, an unscrupulous person can still know where the digits are and can turn the touch events into the digits based on the screenshots. In addition, it is difficult for an authorized software application (e.g., a bank teller software application or an online shopping application) to prevent or to block an unauthorized software application (e.g., malware) from taking screenshots.

Introduced here, therefore, is a technique that can securely display sensitive information or a touch-sensitive user input mechanism (e.g., a keypad) while protecting the displayed information against an attempt to capture such information. As discussed in more detail below, some aspects of the technique include utilizing a personal mobile computing device to generate a number of images. Consider a keypad displayed on a touch-screen as an example. Similar to the pieces of a puzzle (except that each piece may have overlapping portions), each of the displayed images represents a different part of the characters on the keypad, and the images collectively represent the keypad. The generated images are to be displayed to a human user of the mobile computing device by rendering (e.g., using a graphics accelerator in the mobile computing device) the images in the display. The images are displayed sequentially at at least a predetermined minimum frame rate. The predetermined minimum frame rate is configured such that the plurality of images sequentially displayed are perceivable by the human user collectively as the keypad. Ideally, the images are sequentially displayed (e.g., in a random or a predetermined sequence, and/or in a loop) such that, when displayed at or above the minimum frame rate, the images look like one static image—that is, the keypad is substantially statically displayed on the touch screen like a single cohesive image as perceived by the human brain. For purposes of discussion here, the term "static" or "statically" means, when being observed by a human, an object appears to be substantially stationary or lack of movement. The images are generated such that, in each of the plurality of images, at least a part of the characters of the keypad is disguised or concealed, and in some embodiments, to the extent that no single character of the keypad is recognizable by a human or a machine from any single one of the images.

In ways introduced here, no single frame of that sequence entirely reveals all the digits that are on the keypad (or, more generally, all the elements of the protected portion of the user interface). Because the sensitive information is broken down and distributed over time in ways that make it hard or even impossible for an unscrupulous party to decode it by sampling just one or even a few screenshots, the techniques introduced here can securely protect keypad inputs or other sensitive information against screen-capture type malware attacks. Due to the persistence of human visual perception, a human user will still be able to recognize the displayed sensitive information (e.g., the digits on a keypad) when the plurality of images are sequentially displayed, provided a fast enough frame rate is used.

As discussed in greater detail below, in addition to generating a plurality of images, other aspects of the technique can include utilizing one or more masks to conceal portions of the key pad or sensitive information. In some implementations, the same or similar security effects may be achieved by varying a location and/or a depth (e.g., as defined in a z-buffer) of a mask (e.g., a non-transparent geometric shape such as a rectangle or a triangle, or a non-transparent three-dimensional object). In other examples, the images can be generated by varying an opacity, translucency, or transparency of a mask or by inserting different masks. Additionally, a suitable combination of the above-mentioned generation of images and other known information display security techniques such as distorting content of the sensitive information can be utilized to increase the security level even further. For example, the image generation or concealment techniques introduced here can be combined with other known techniques such as inserting different light effect filters, distorting or obscuring content (e.g., CAPTCHA-style distortion), varying light source, hue, contrast, rendered texture, shading techniques (e.g., Phong shading or flat shading) and/or other suitable lighting effects. Even further, some embodiments introduced here can selectively insert bogus data (e.g., onto some of the plurality of images that are generated) to confuse the unscrupulous party.

In the following description, the example of a point-of-sale (POS) system in a restaurant is used, for illustrative purposes only, to explain various aspects of the technique. Note, however, that the technique introduced here is not limited in applicability to restaurants or to any other particular kind of business. Additionally, the technique introduced here is not limited to use with displaying keypads for PIN or passcode entry for credit cards or other types of payment cards; rather, the technique can be employed with essentially any suitable scenario that traditionally would involve the display of sensitive information. Additionally, the term "sale," as in point-of-sale (POS), refers to any type of payment-oriented transaction, including providing of a service, a lease or rental for example, and is not limited to an actual purchase. Note also that in this description, the term "user" generally refers to a customer (as opposed to a merchant), except where otherwise indicated, and except that the term "user interface" does not necessarily refer to an interface used by a customer, as will be apparent from the context.

FIG. 1 illustrates an environment within which the secure display element techniques introduced here can be implemented (e.g., in conjunction with a credit card transaction where sensitive information such as card number, expiration date, cardholder's name, and the card verification value (CVV) code may be displayed). The environment includes a merchant POS system 104 of a merchant 100. Optionally, the environment can further include a mobile device 102 of a user 101 (also referred to as a "customer" or a "consumer"). The environment also includes a computer system 114 of the merchant's acquirer, a computer system 118 of an issuing bank, a computer system 116 of a card payment network, and optionally, a computer system 108 of a payment service (hereinafter "payment service system 108"). Each of the aforementioned computer systems can include one or more distinct physical computers and/or other processing devices which, in the case of multiple devices, can be connected to each other through one or more wired and/or wireless networks. All of the aforementioned devices are coupled to each other through an internetwork 106, which can be or include the Internet and one or more wireless networks (e.g., a Wireless Fidelity (WiFi) network and/or a cellular telecommunications network).

Figure 2A:
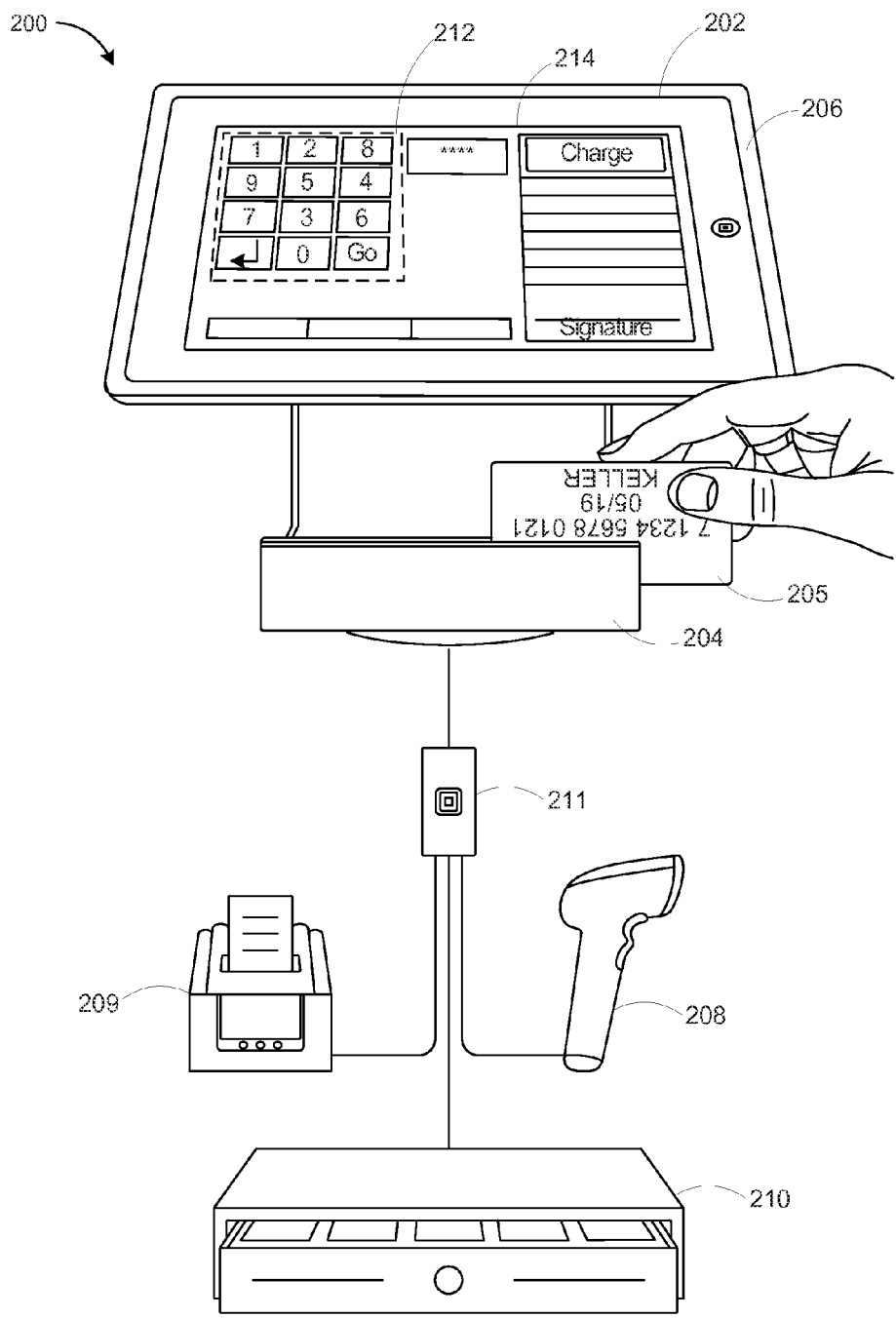
FIG. 2A illustrates a specific example of a scenario in which a point-of-sale (POS) system displays a PIN entry interface on its touchscreen.

The POS system 104 may be a general purpose computer, a specific computer designed for POS purposes, and/or a combination thereof (e.g., a tablet computer combined with a docking station designed for POS purposes, such as one illustrated in FIG. 2A), and may include a display screen for, among other functions, displaying information including the sensitive, payment information. The user's mobile device 102 can be, for example, a smart phone, tablet computer, notebook computer, or any other form of mobile processing device, all of which may have a display screen for displaying information. In some implementations of the optional embodiment, a mobile payment application 120 can run on the user's mobile device 102 to interact with other components in the environment; for example, in one embodiment, the mobile payment application 120 can receive a digital version of a transaction receipt from the merchant and/or can be utilized to view details of transactions and payment information. In some examples, the user's mobile device 102 can run a web browser 122 that can load websites (e.g., hosted by the merchant 100 or by the payment service system 108) within which transaction information and other payment details can be displayed online. Similarly, the merchant 100 can use his or her computing devices (not shown in FIG. 1 for simplicity) to log in to his or her account on webpages provided by a payment service system 108 for viewing various details of transactions.

In a typical credit card transaction, the merchant 100 swipes the user 101's credit card through a card reader at the merchant's POS system 104. Further, in debit, EMV, and other similar transactions, the user can enter a PIN number (e.g., into the POS system 104 or the mobile device 102). The POS system 104 sends data read from the card (e.g., the cardholder's name, credit card number, expiration date and CVV) to the computer system 114 of the merchant's acquirer (hereinafter "acquirer 114"). The acquirer 114 sends this data to the computer system 116 of the card payment network (e.g., Visa or MasterCard) (hereinafter "card payment network 116"), which forwards the data to the computer system 118 of the issuing bank (hereinafter "issuer 118"). If the transaction is approved by the issuer 118, a payment authorization message is sent from the issuer 118 to the merchant POS system 104 via a path opposite of that described above.

All the aforementioned pieces of financial transaction information can be displayed on the screens of various devices (e.g., the POS system 104, or the mobile device 102) and therefore are examples of sensitive information that are susceptible to attacks from screen-capturing malware.

FIG. 2A illustrates a specific example of a scenario in which a POS system displays a PIN entry interface on its touchscreen. A payment system 200, which is an embodiment of the POS system 104 of FIG. 1, includes an electronic device 202 that is illustrated in FIG. 2A as displaying a PIN pad interface for secure passcode entry, in which the disclosed technique may be applied. Note that the electronic device 202 of FIG. 2A, which is illustrated as being used in a point-of-sale (POS) setting, is used here as merely an example; other devices described in FIG. 1, such as the mobile device 102, may also encounter similar scenarios where a keypad (or an interactive form) is displayed for entry of sensitive information.

The electronic device 202 is a data processing device (e.g., which may be either general-purpose or application-specific). For example, the electronic device 202 may be a mobile phone, a tablet, an e-reader, other mobile or portable computing devices, or other stationary computing devices. The electronic device 202 may be configured to facilitate a financial transaction. The electronic device 202 may be coupled to a card reader 204, which can initiate a financial transaction to purchase items from a merchant operating the electronic device 202 upon detecting a swipe of a payment card 205.

In the illustrated embodiment, the card reader 204 is integral to a docking station 206 and is coupled to the electronic device 202 through the docking station 206. In other embodiments, however, the card reader 204 can be a separate component connected to the electronic device 202 or to the docking station 206. For example, in embodiments, the card reader 204 may be replaced by a dongle type attachment that plugs into an audio port or data connector port of the electronic device 202 and performs similar function of detecting swipe of the payment card 205 and transfers information to the electronic device want to. The electronic device 202 may fit into a cavity of the docking station 206 as shown.

In the illustrated embodiment, the docking station 206 and/or the electronic device 202 are coupled to one or more peripheral components, such as a label reader 208, a receipt printer 209, or a cashier drawer 210. The peripheral components can be coupled to the electronic device 202 through a hub device 211, such as a wired hub or a wireless router. A user may purchase various items for checkout through one of the peripheral components, such as through the label reader 208 coupled to the electronic device 202, through a user's mobile device, or through a storefront interface on the electronic device 202. During checkout, the card reader 204 can read and/or access the payment card 205. The payment card 205 may be a credit card, a debit card, an EMV card, or another type of passive or active payment device. The payment card 205 may communicate, for example, via magnetism, electrical signal, radio frequency, near field communication (NFC), acoustic wave, optical modulation, or another method or methods of communication.

Usage of the payment card 205 may require verification of a user identity. One method of verifying the user identity includes having the user inputting a passcode entry and verified the passcode entry against an authentic passcode stored on a remote computer system or on the payment card 205. For example, the electronic device 202 can display a passcode entry interface 212 on a touchscreen 214 of the electronic device 202. Once the payment card 205 and the user identity are verified through the passcode entry interface 212, the electronic device 202 may facilitate the completion of financial transaction.

When the user inputs each character entry, the passcode entry interface 212 can implement a variety of security mechanisms to protect the passcode composition from getting stolen. As mentioned, randomizing digits (by scrambling out of sequence the character labels on buttons of the passcode entry interface, as shown in FIG. 2A) is already proven to effectively prevent an onlooker that is in physical vicinity of the device from stealing the passcode composition.

Figure 2B:
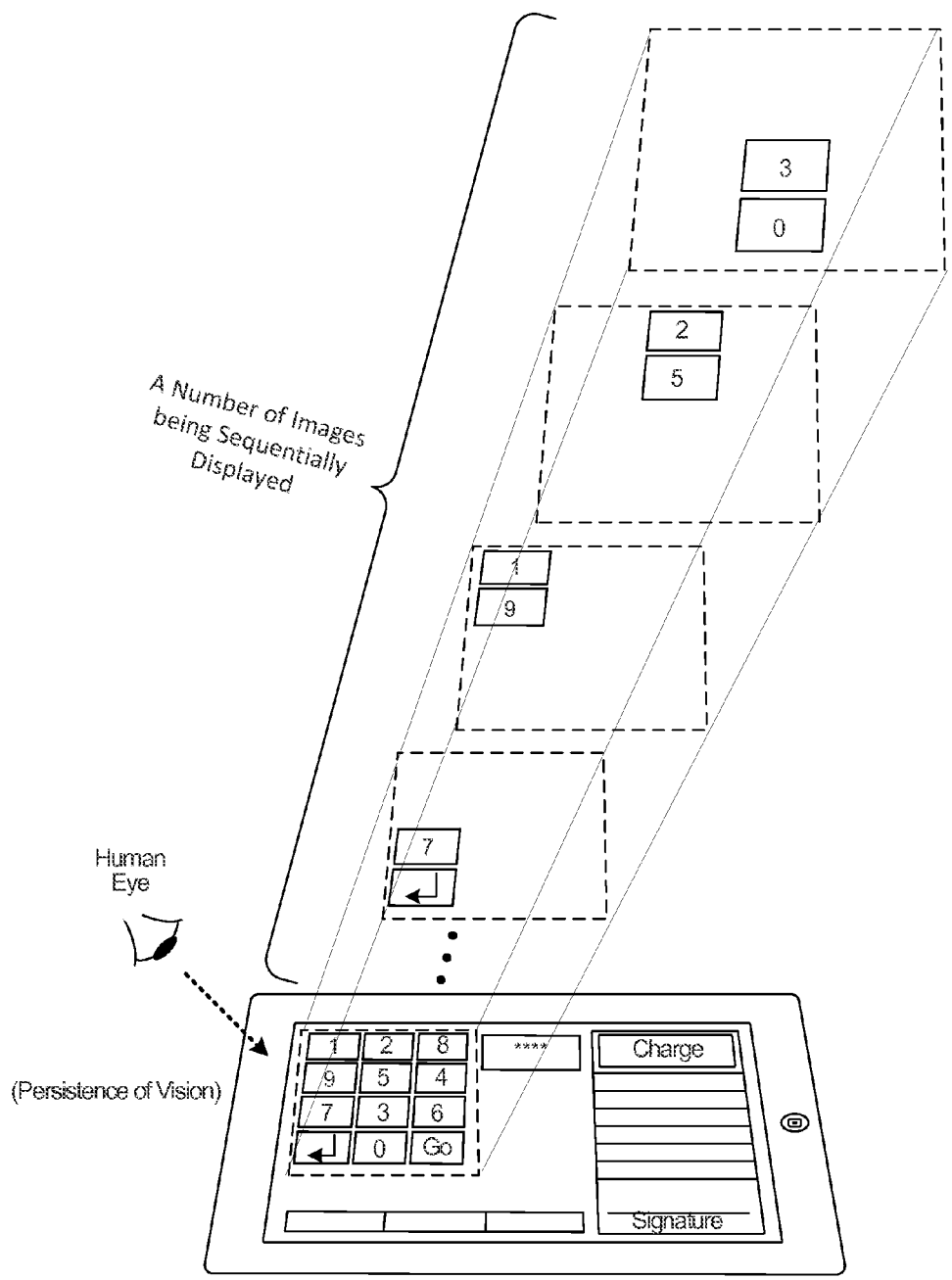
FIG. 2B illustrates a number of images being sequentially displayed by the POS system at a predetermined minimum frame rate, where the set of images collectively represent the PIN entry interface of FIG. 2A.

Based on the technique introduced here, the electronic device 202 can further generate a number of images that collectively represent the PIN entry interface of FIG. 2A, an example of which is illustrated in FIG. 2B. By the electronic device 202 sequentially displaying these images at a predetermined minimum frame rate (and based on human eye's persistence of vision), the set of images can be perceived by human eye as one cohesive, substantially static image. However, as described in more specificity below, by not displaying all of the plurality of images at any instant in time (e.g., as illustrated in FIGS. 5A through 5D), the electronic device 202 can prevent passcode combination or other suitable displayed sensitive information from being captured and/or decoded by a malicious software, whether the malicious software is installed locally on the electronic device 202 or remotely on another computing device. Note that, for purposes of discussion herein, generating of "images" shall not be construed as being limited to the generation of actual, discrete image files; rather, the term is used to generally refer to the generation of data or data structures that represent (e.g., when being rendered by a graphics hardware on a display device) a plurality of images; in other words, the data generated are operable to facilitate the graphics hardware to render the plurality of images (e.g., in a sequential manner).

Figure 3A:
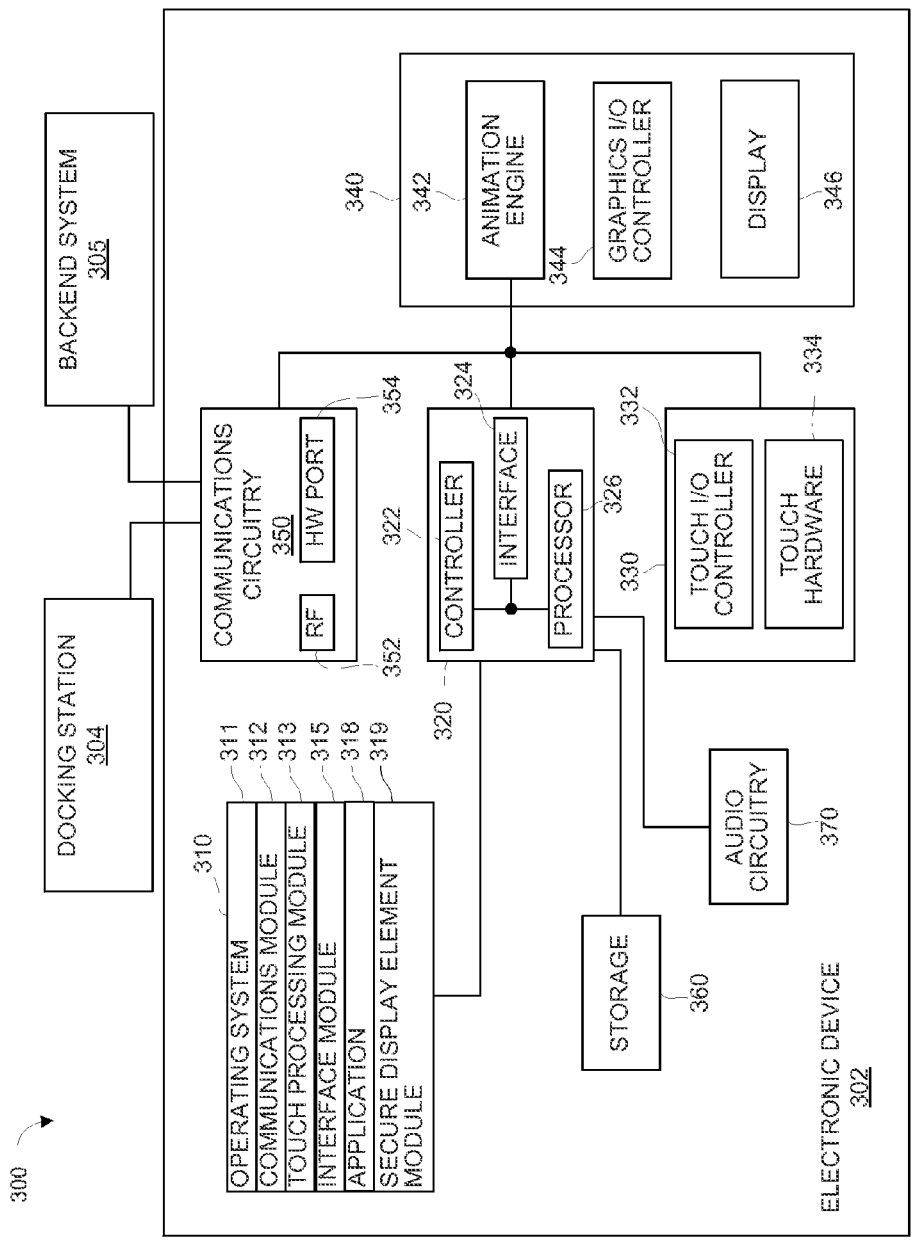
FIG. 3A illustrates a block diagram of a POS system including an electronic device and a docking station, the electronic device including examples of components that are configured to implement some embodiments introduced here.

FIG. 3A illustrates a block diagram of a POS system 300 (e.g., the POS system 104 of FIG. 1) including an electronic device 302 (e.g., the electronic device 202 of FIG. 2A), a docking station 304 (e.g., the docking station 206 of FIG. 2A), and a backend system 305 (e.g., the payment service system 108 of FIG. 1). Note that the architecture shown in FIG. 3A is only one example of an architecture for a system which may be used for passcode entry in accordance with the technique introduced here; further, the electronic device 302 in FIG. 3A could have more or fewer components than shown, or a different configuration of components. The various components shown in FIG. 3A can be implemented by using hardware, software, firmware or a combination thereof, including one or more signal processing and/or application specific integrated circuits.

The electronic device 302 that can include one or more computer-readable mediums 310, processing system 320, touch subsystem 330, display/graphics subsystem 340, communications circuitry 350, storage 360, and audio circuitry 370. These components may be coupled by one or more communication buses or other signal lines. The electronic device 302 can be the same as or similar to the electronic device 102 or the electronic device 202.

The communications circuitry 350 can include RF circuitry 352 and/or port 354 for sending and receiving information. The RF circuitry 352 permits transmission of information over a wireless link or network to one or more other devices and includes well-known circuitry for performing this function. The port 354 permits transmission of information over a wired link. The communications circuitry 350 can communicate, for example, with the docking station 304 or the backend system 305 for verifying the passcode entry. The communications circuitry 350 can be coupled to the processing system 320 via a peripherals interface 324. The peripherals interface 324 can include various known components for establishing and maintaining communication between peripherals and the processing system 320.

The audio circuitry 370 can be coupled to an audio speaker (not shown), a microphone (not shown), an electronic card reader (not shown), or any combination thereof and includes known circuitry for processing voice signals received from the peripherals interface 324 to enable a user to communicate in real-time with other users. In some embodiments, the audio circuitry 370 includes a headphone jack (not shown).

The peripherals interface 324 can couple various peripherals, such as an electronic card reader, of the system to one or more processors 326 and the computer-readable medium 310. The one or more processors 326 can communicate with one or more computer-readable mediums 310 via a controller 322. The computer-readable medium 310 can be any device or medium that can store code and/or data for use by the one or more processors 326. The medium 310 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 310 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The touch I/O controller 332 is coupled to the touch hardware 334 for controlling or performing various functions. The touch hardware 332 communicates with the processing system 320 via the touch I/O device controller 332, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 334 displays visual output to the user in a GUI. The visual output may include text, graphics, video, and any combination thereof. Some or all of the visual output may correspond to user-interface objects. The touch hardware 334 forms a touch-sensitive surface that accepts touch input from the user. The touch hardware 334 and the touch controller 332 (along with any associated modules and/or sets of instructions in the medium 310) detects and tracks touches or near touches (and any movement or release of the touch) on the touch hardware 334 and converts the detected touch input into interaction with graphical objects, such as one or more user-interface objects. In the case in which the touch hardware 334 and the display 325 are embodied as a touch screen, the user can directly interact with graphical objects that are displayed on the touch screen. Alternatively, in the case in which hardware 334 is embodied as a touch device other than a touch screen (e.g., a touch pad), the user may indirectly interact with graphical objects that are displayed on a separate display screen. Embodiments in which the touch hardware 334 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

In some embodiments, the peripherals interface 324, the one or more processors 326, and the memory controller 322 may be implemented on a single chip. In some other embodiments, they may be implemented on separate chips. The storage 360 can any suitable medium for storing data, including, for example, volatile memory (e.g., cache, RAM), non-volatile memory (e.g., Flash, hard-disk drive), or a both for storing data, including pages used for transition animations.

The one or more processors 326 can run various software components stored in the medium 310 to perform various functions for the electronic device 302. Note that the order of the modules in the medium 310 does not necessarily denote the order of layers of a software stack as implemented in the medium 310. In some embodiments, the software components include an operating system 311, a communication module (or set of instructions) 312, a touch processing module (or set of instructions) 312, an interface module (or set of instructions) 315, which can include a secure display element module 319, and one or more applications (or set of instructions) 318. The secure display element module 319 is illustrated in FIG. 3 as a separate module in accordance with some embodiments. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. In some embodiments, the medium 310 may store a subset of the modules and data structures identified above. Furthermore, the medium 310 may store additional modules and data structures not described above.

The operating system 311 can include various procedures, sets of instructions, software components and/or drivers for controlling and managing general system tasks (e.g., memory management, storage device control, power management, etc.) and facilitates communication between various hardware and software components.

The communication module 312 facilitates communication with other devices using the communications circuitry 350 and includes various software components for handling data received from the RF circuitry 352 and/or the port 354.

The touch processing module 313 includes various software components for performing various tasks associated with touch hardware 334 including but not limited to receiving and processing touch input received from the I/O device 330 via a touch I/O device controller 332. For example, the touch processing module 313 can also include software components for performing tasks associated with other I/O devices (not shown).

One or more applications 318 can include any applications installed on the electronic device 302, including without limitation, modules of the electronic device 200, a browser, keyboard emulation, widgets, JAVA-enabled applications, encryption, digital rights management, voice recognition, voice replication, location determination capability (such as that provided by the global positioning system (GPS)), etc.

The interface module 315 can provide animation instructions to an animation engine 342, which can render the graphics and provide the rendering to graphics I/O controller 344, so that the graphics I/O controller 344 can display the graphics on display 346. The interface module 315 can further control the audio circuitry 370 to provide an auditory component to the passcode interface. The interface module 315 can include various known software components for rendering, animating and displaying graphical objects on a display surface. The secure display element module 319, which may be integrated with the interface module 315, is configured to present and maintain a predetermined display area for securely displaying sensitive information or, in this case, a passcode interface for a user to enter a passcode to authenticate the user's identity.

Figure 3B:
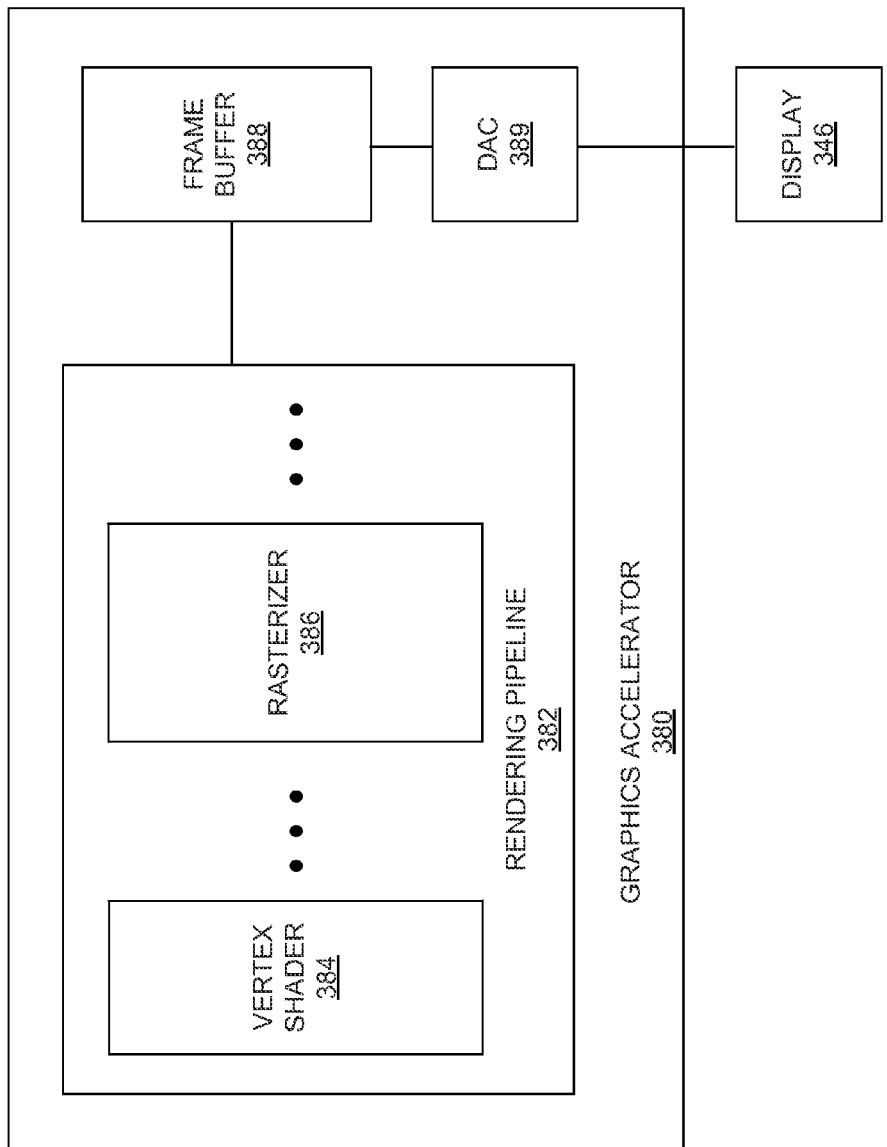
FIG. 3B illustrates a block diagram of an example of a graphics accelerator in the electronic device of FIG. 3A, the graphics accelerator including examples of components that are configured to implement some embodiments disclosed herein.
Figure 4D:
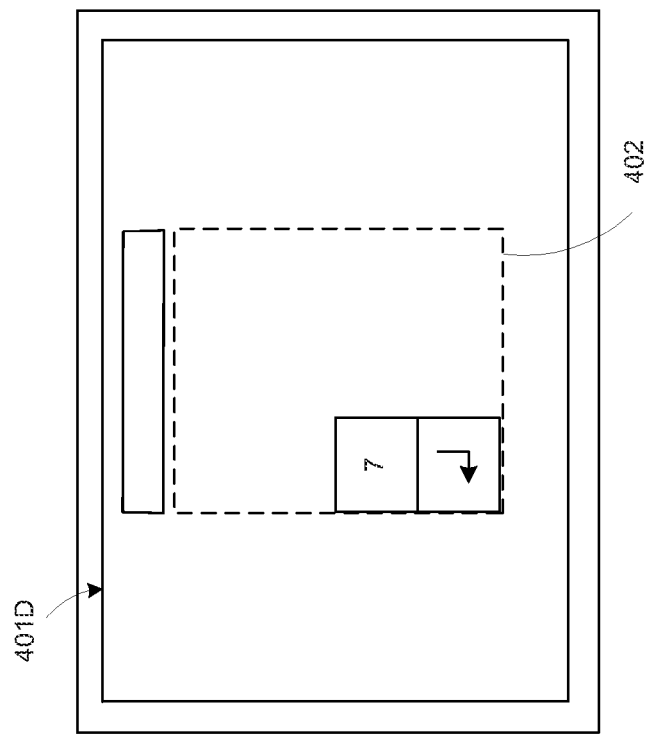
Figure 4C:
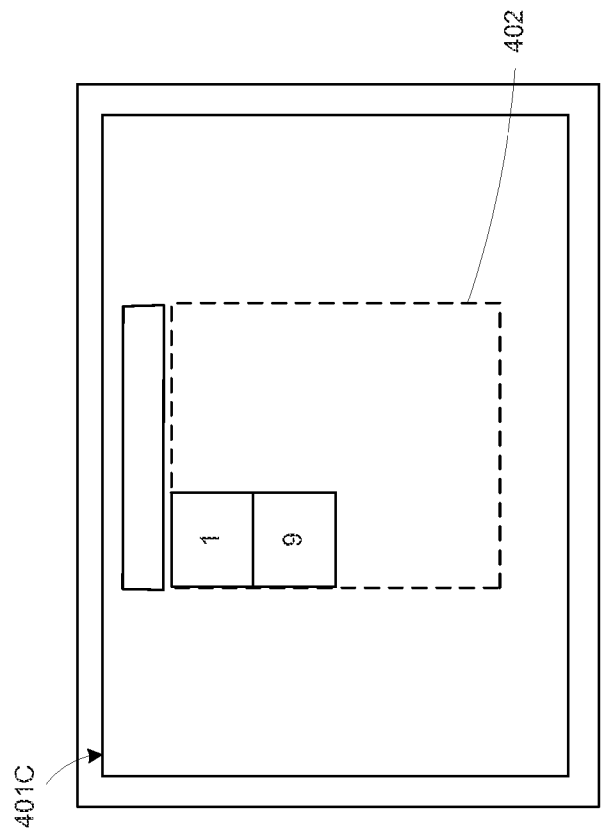
Figure 4F:
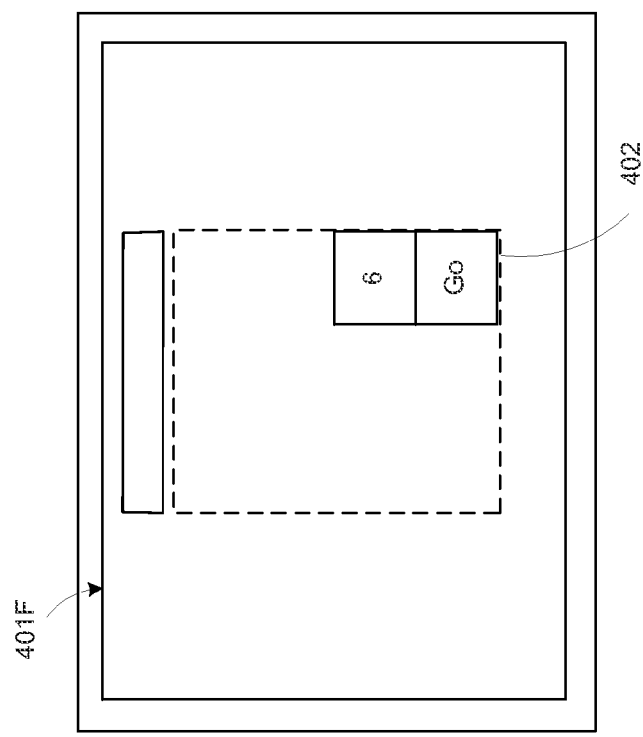
Figure 4E:
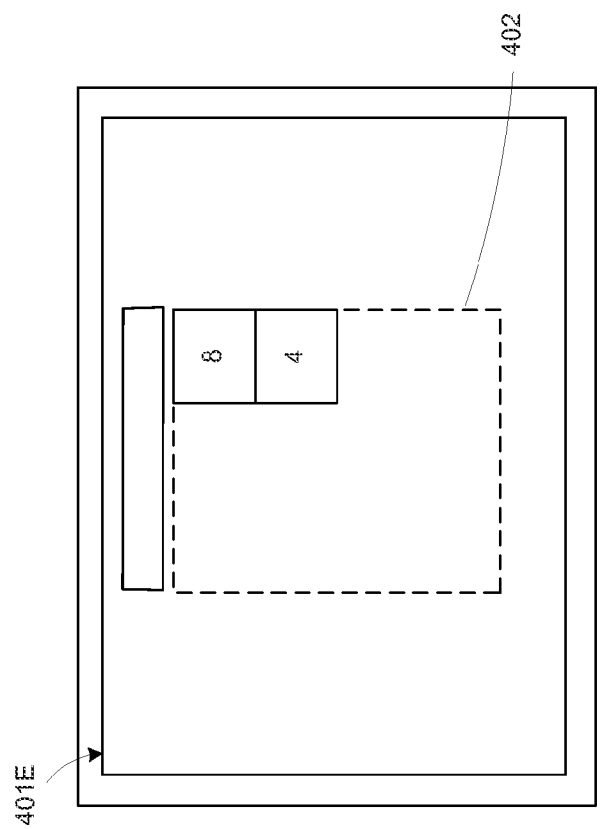
Figure 5A:
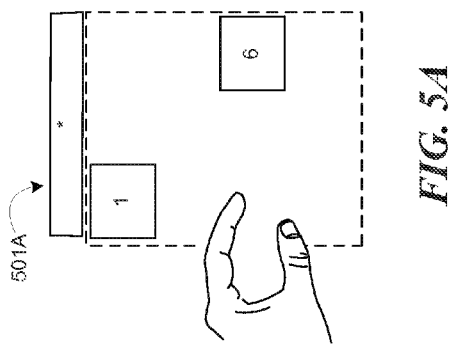
FIGS. 5A through 5D respectively illustrate one set of demonstrative examples of screenshots taken by a software application installed on the electronic device of FIG. 3B.
Figure 5B:
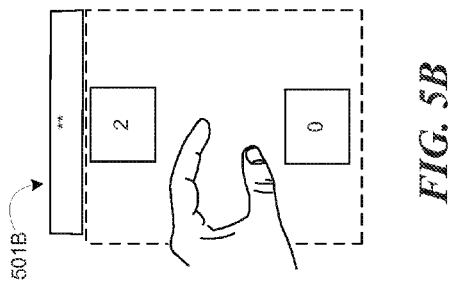
Figure 5C:
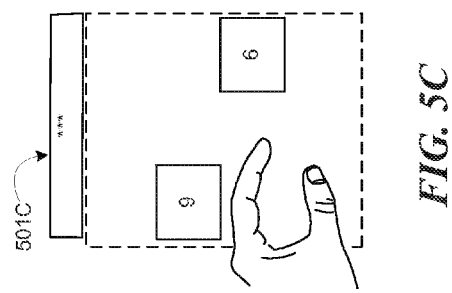
Figure 5D:
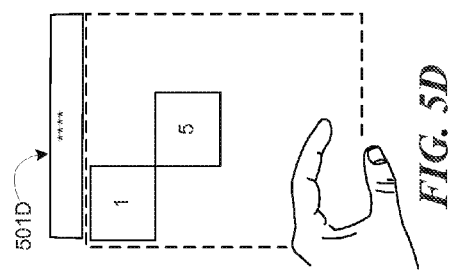
Figure 5E:
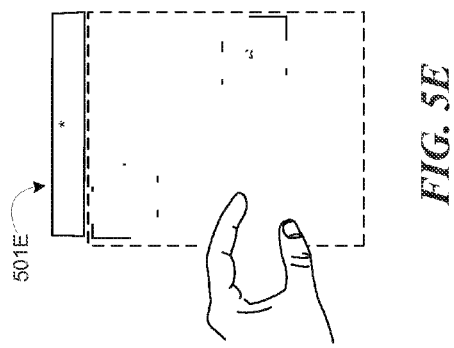
FIGS. 5E through 5H respectively illustrate another set of demonstrative examples of screenshots taken by a software application installed on the electronic device of FIG. 3B.
Figure 5F:
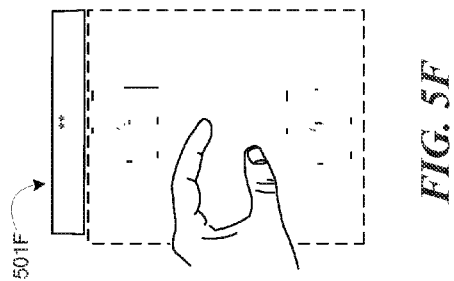
Figure 5G:
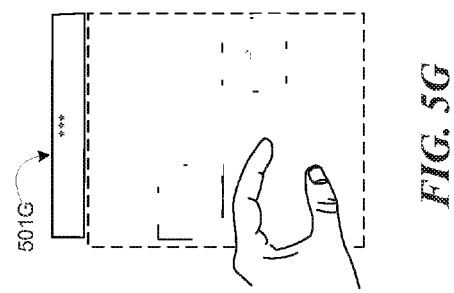
Figure 5H:
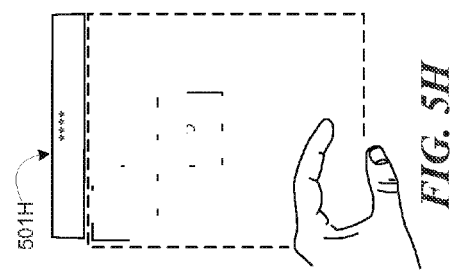

FIG. 3B illustrates a block diagram of an example of the graphics accelerator 380 in the electronic device 302 of FIG. 3A. The graphics accelerator 380 is an embodiment of the animation engine 342 of FIG. 3A and includes examples of components that are configured to implement some aspects of the technique introduced here. Note that, in some embodiments of the electronic device 302, one or more modules of the graphics accelerator 380 may be merged into the processing system 320.

The graphics accelerator 380 includes a rendering pipeline 382, which typically includes a vertex shader 384 (which can be coupled to or be in the form of a vertex processor (not shown)), a rasterizer 386, and a frame buffer 388. The graphics accelerator 380 may also include other known components such as texture mapping hardware, sub-processors (e.g., a fragment processor), buffers, and/or other I/O controller; these components are not shown for simplicity; consequently, the components shown in FIG. 3B are communicatively coupled to each other, which may be directly or indirectly connected to each other through one or more interconnects or wires.

The vertex shader 384 receives vertex data from the host CPU that defines the primitives that make up the view to be displayed. The geometry accelerator typically includes various components for graphics rendering, such as a clipping component, an illumination component, and a plane equations component. The transform component can perform transformations on the vertex data received by the rendering pipeline 382 (e.g., from the CPU, such as rotation and translation of the image space defined by vertex data). Next, the clipping component can reduce the amount of necessary calculation by clipping the vertex data so that only vertex data relating to primitives that make up the portion of the view that will be seen by the user is kept for further processing. The illumination or lighting component then calculates the final colors of the vertices of the primitives based on the vertex data and based on lighting conditions. The plane equations component generates floating point equations which define the image space within the vertices. The floating point equations are later converted into fixed point equations before being rasterized.

Thereafter, the rasterizer 386 and the texture mapping hardware (not shown) generate the final screen coordinates and color data for each pixel in each primitive. The pixel data is stored in the frame buffer 388 for display, after being converted from digital form into analog form by a digital-to-analog (DAC) converter 389 for example, on a video display screen 346. In variations, the DAC 389 is not necessary, and the pixel data is transferred from the frame buffer digitally to the display 346. In this sense, various components (e.g., the vertex shader 384 and the rasterizer 386) in the rendering pipeline 382 can generate, based on the instruction(s) received from the processing system 320, a plurality of images to be displayed on the display 346.

Notably, FIG. 3B is an abstract, simplified diagram in which some of the illustrated components may include subcomponents. For example, the vertex shader 384 may be implemented as a multi-core shader processor having a plurality of shader cores. It is not uncommon to see hundreds of specialized cores with highly parallel structures in modern GPU designs. Further, according to some of the present embodiments, the vertex shader 384 is a programmable shader processor(s) that can be programmed (e.g., by loading one or more "shaders" into the shader processor) to perform a variety of shading tasks (in addition or as an alternative to the vertex shading introduced above). For purposes of discussion herein, the term "shader" can generally mean, as will be apparent from the context, (i) a shader program, (ii) a shader hardware, or (iii) a combination of a shader program loaded in a programmable shader hardware, that is used to perform "shading"—the production of appropriate levels of color within an image, or, in some instances, to also produce special effects or do image/video post-processing.

FIGS. 4A through 4F respectively illustrate one set of example images that an electronic device (e.g., the electronic devices 102, 202, 302, or the POS system 104) can generate to securely display a PIN entry interface against a screen capturing software on the electronic device. In FIGS. 4A through 4F's example set, images 401A through 401F are generated by the secure display element module 319, each image showing one segment of the keypad. The following description will primarily focus on the example of the PIN entry interface (and in particular, the scrambled keypad shown in FIG. 2B) for simplicity. However, similar techniques can be used to securely display sensitive information, such as displaying the last four digits of a social security number. The set of example images of FIGS. 4A through 4F are explained below with reference to FIGS. 3A through 3B.

According to some embodiments, an instruction first is received to display a keypad for PIN entry (or to display a piece of sensitive information) in a predetermined area 402 (e.g., the area where the passcode entry interface 212 is shown in FIG. 2A). As one example, the instruction can be received internally within the electronic device, such as from the application 318 (e.g., a POS software application) to the interface module 315 (or the secure display element module 319), to display a PIN pad for authenticating the transaction when a debit card is swiped through the card reader. In another example, the instruction can be received from the application 318 (e.g., the mobile payment application 120 or the web browser 122). As yet another example, the instruction can be received externally, such as from the backend system 305 to the electronic device 302, to display a piece of sensitive information on the screen. Depending on the embodiment, the instruction can be received through the communications circuitry 350 (e.g., in the case that the instruction's source is external) and/or via an application programming interface (API) that is implemented in the secure display element module 319 (e.g., in the case that the instruction's source is internal). In the example of FIGS. 4A through 4F, the keypad is to be displayed in a predetermined display area 402 of a display equipped with the electronic device. The keypad is displayed for a human user (e.g., user 101 or merchant 100) of the electronic device to enter a personal identifier number (PIN) by use of the keypad. As shown in the figures, the keypad includes a plurality of characters for a user to enter the PIN into the computing device via the keypad.

In response to the instruction, the electronic device generates a plurality of images that each represent a different segment of the keypad in one or more ways introduced here. The plurality of images can collectively represent the keypad being statically displayed on the screen of the electronic device. In some embodiments, the generation of the images is performed by the secure display element module 319 issuing instructions (e.g., through the processing system 320) to the display/graphics subsystem 340. Typical application programming interface (API) for controlling the display/graphics subsystem 340 (e.g., the graphics accelerator 380) include OpenGL(™), Direct X(™), WebGL(™), and so forth. In many embodiments, the graphic acceleration hardware equipped on the electronic device 302 are capable of rendering three-dimensional graphics at 45-60 frames per second or higher (assuming normal graphics complexity), which may be above what an human eye is able to perceive.

More specifically, according to some implementations, the secure display element module 319 can cause to load a shading function (or more generally, an image processing function) into the vertex shader 384 of the graphics accelerator 380. The shading function or the image processing function configures the graphics accelerator 380 such that, at any instant in time, at least one part of the characters of the keypad is disguised or concealed. For purposes of discussion herein, the term "disguise" means to alter a piece of information's visual appearance and/or its content in order to conceal the true content of the information; the term "mask" means to use a covering to cover all or part of the information; and, the term "conceal" means to prevent from being known, which can achieved by, for example, disguising or masking the information.

Then, as mentioned above, the rasterizer 386 of the graphics accelerator 380 converts the outputs sourced from the vertex shader 384 into pixel information that respectively represents the plurality of images. In some embodiments, the conversion may take place on the fly as one or more of the plurality of images are generated. In variations, the conversion may be timed by one or more controllers based on how full a buffer that is used to store the input data for the rasterizer 386 is.

According to some embodiments, the secure display element module 319 can generate the plurality of images by separating the PIN pad into a number of discrete images, similar to a process of a paper shredder. As an alternative to separating the PIN pad, the secure display element module 319 can generate the plurality of images by masking different portions of the PIN pad each time the secure display module 319 creates an image. For example, in one implementation, the PIN pad has random digits and each frame (or image) only displays one of the random digits. However, note that in the embodiments where the content of the segments are randomly selected from the keypad, extra mechanisms may be needed in the secure display element module 319 to ensure that all portions of the keypad are still adequately represented by the totality of the plurality of images without missing any portion.

As respectively shown in FIG. 4A through 4F, each of the images 401A through 401F represents a different part of the plurality of characters, but images 401A through 401F collectively represent the keypad, with each of the images 401A through 401F representing two keys out of the twelve keys in total. It is noted that the example set of images shown in FIGS. 4A through 4F are intentionally simplified in order to facilitate easier understanding of the readers; specifically, the example set is simplified in that the PIN interface is only "broken" (or "segmented") into six images, with each image displaying two keys, that the segmentation is predictable and rectangular, and that there is no overlapping among the segments. As a practical matter, for increased the security level, each segment of the image should be small enough to disguise the critical information or the digits on the PIN pad, for example, by further separating each of the two keys displayed in images 401A through 401F into two smaller triangles (not shown for simplicity). The segmentation may be random so that the resulting segments are not predictable. Additionally or alternatively, the segmentation can follow features existing in the unsegmented image. For example, a line-detection algorithm can detect the line features in the unsegmented image of the keypad, and can then segment the keypad along these detected line features. The shape of the segment can include, but not limited to, rectangular, parallelogram, lozenge, or random. The determination of the dimensions of each segment can take reference from numerous standards for the security levels of paper shredders, including German Institute for Standardization (DIN) 66399, for example. In some example implementations, each image only contains a fragment (or segment) that is of a certain predetermined percentage (e.g., 3%) of the display area 402 (whether for displaying the keypad or for displaying sensitive information). To further increase the security level, the image processing function (by which the security display element module 319 controls how the segments or the plurality of images are generated) can automatically vary over time. For example, the shape and size of the segments can be changed as time passes by so that the segments are even more irregular, increasing the difficulty of extrapolating the passcode from screenshots because the way how one screenshot is segmented may not be the same as a subsequent screenshot.

Note that the information displayed on each segment is not necessarily mutually exclusive of that on another segment. In one or more embodiments, each segment can have overlapping information with another segment, though such overlapping is not illustrated in images 401A through 401F. Overlapping may happen, for example, when the content of each segment is randomly selected (such as resulting from using a mask of random shape and/or at random locations). However, note that in the embodiments where the content of the segments are randomly selected, extra mechanisms may be needed in the secure display element module 319 to ensure that all portions of the keypad are still adequately represented by the totality of the plurality of images without missing any portion. In addition, having too much overlapping information among the segments may adversely affect the security level because it makes it easier for an unscrupulous party to deduce (e.g., by interpolation or extrapolation) what information is disguised or concealed.

After the generation of segmented images, the images are sequentially displayed (or rendered) in the secured display area at at least a predetermined minimum frame rate, so that the keypad appears to be displayed to the human user as one substantially static image. Specifically, the rasterizer 386 stores the pixel information that is converted based on the outputs of the vertex shader 384 into the frame buffer 388 of the graphics accelerator. That is to say, the rendering pipeline 382 causes the plurality of images to be rendered in sequence at a frame rate by storing the plurality of images into the frame buffer 388, the information stored in which is in turn output to the display 346 for display. The rendering of the plurality of images are performed such that not all of the plurality of images are displayed at any instant in time; however, because the plurality of images are displayed sequentially at or above the predetermined minimum frame rate, the plurality of images sequentially displayed are perceivable by the human user collectively as the keypad. Note that the sequence that the plurality of images are displayed need not be the sequence that each of the images is generated; the display sequence can be a random sequence.

There are multiple theories on the psychophysics of human vision, and among them, the persistence of vision is a theory where an afterimage is thought to persist for approximately one twenty-fifth of a second on a human's retina. As such, when the plurality of images are displayed sequentially at or above the predetermined minimum frame rate, the plurality of images are perceived as a substantially static image. Note that whether or not an individual person can actually detect flicking at the determined minimum frame rate defers by each person, and this is because the flicker fusion threshold is a statistical rather than an absolute quantity. Typically, there is a range of frequencies within which flicker sometimes will be seen and sometimes will not be seen. However, objectively speaking, for purposes of practicing the techniques here, a minimum frame rate of 24-30 frame per second or above is desirable—although a lower frame rate, which may cause the displayed keypad to flicker, may be acceptable.

Generally, the steadiness (i.e., the property of not visibly flickering) of the displayed keypad increases when the plurality of images are sequentially rendered at a higher frame rate. However, because the frame rate that the display/graphics subsystem 340 may vary depending on the performance of the computing system (e.g., raw computing power of GPU/CPU, current workload, etc.), some embodiments of the secure display element 319 can dynamically adjust the image processing function based on the performance of the computer. In some embodiments, the secure display element module 319 can first determine the predetermined minimum frame rate based on a computing performance of the electronic device, for example, during a start-up phase or a set-up phase. Then, during normal operation, the secure display element module 319 can dynamically adjust the total number of the segments (or granularity) based an updated computing performance of the electronic device. In this way, the number of segments (i.e., the granularity or "security level") can be adjusted to compensate dropping frame rate in slower machines. For example, if the granularity is high (i.e., the size of each segment is small) and when the secure display element 319 detects that the frame rate at which the plurality of images are sequentially displayed is dropping to close or below a predetermined minimum frame rate (e.g., 15 fps), then the secure display element 319 can reduce the granularity (i.e., increasing the size of each segment), thereby reducing the number of images that needs to be produced and handled by the display/graphics subsystem and/or the processing system 340. Nonetheless, the secure display element 319 can also be configured to have a minimum security level, for example, not allowing the granularity of the segments to be reduced to a level that is undesirably unsecure. One example the minimum security level is that the keypad should be segmented into at least 20 images; other suitable numbers and/or units (such as a maximum percentage, out of the total image, each segment can display) may be applicable depending on the application.

FIGS. 5A through 5D respectively illustrate one set of demonstrative examples of screenshots taken by a software application installed on the electronic device of FIG. 3B. The software application (or "the malware") configured to capture a screenshot as well as log the coordinates of the touch events upon each detection of user input on the PIN pad (i.e., activation of touch screen). As shown in FIGS. 4A through 5D, screenshot images 501A through 501D are respectively taken by the malware installed on the electronic device 302 when the unsuspecting user inputs each of the four PIN digits via the displayed PIN pad. Image 501A is captured when the first digit is input, image 602A when the second digit is input, and so forth.

With the disclosed embodiments, the unscrupulous party will not able to fully deduce passcode from the captured images 501A through 501D. In contrast, without the technique disclosed here, if a keypad is fully displayed and captured by the screenshots, even with scrambled digits, the unscrupulous party can easily steal the password by the malware logging the location of the touch event and matching the locations with PIN pad in the screenshot. In this way, because any single frame of that sequence does not reveal what the digits are on the keypad, the disclosed embodiments can securely protect sensitive information displayed on a computer device against attempts to capture such information by malware running on the same or another computer. But, relying on the persistence of vision, a human user will still be able to recognize the digits on the keypad (or a piece of sensitive information) when the plurality of images are sequentially displayed.

Note that, for facilitating the description, the shown screenshots are intentionally simplified and relatively straight forward to extrapolate some digits that the user has input—for example, the unscrupulous party can deduce that the digit entered on image 501B is "5" by matching the location with the image 501D. In practice, the secure display element 319 can display the PIN pad with a finer granularity and/or with irregular segments so that, in some embodiments (such as illustrated by screenshots in FIGS. 5E through 5H), no digit can be recognizable on any single image. Further, note that the images 501A through 501D are implemented with a PIN pad with randomized digits (which is the same one as shown in FIG. 2B). As is demonstrated by the images 501A through 501D, randomizing the digits does increase the security level because it reduces the possibility of the passcode being successfully extrapolated simply by the monitoring the location of the touch events; however, randomizing the digits may not be necessary for implementing the techniques disclosed here.

Figure 6B:
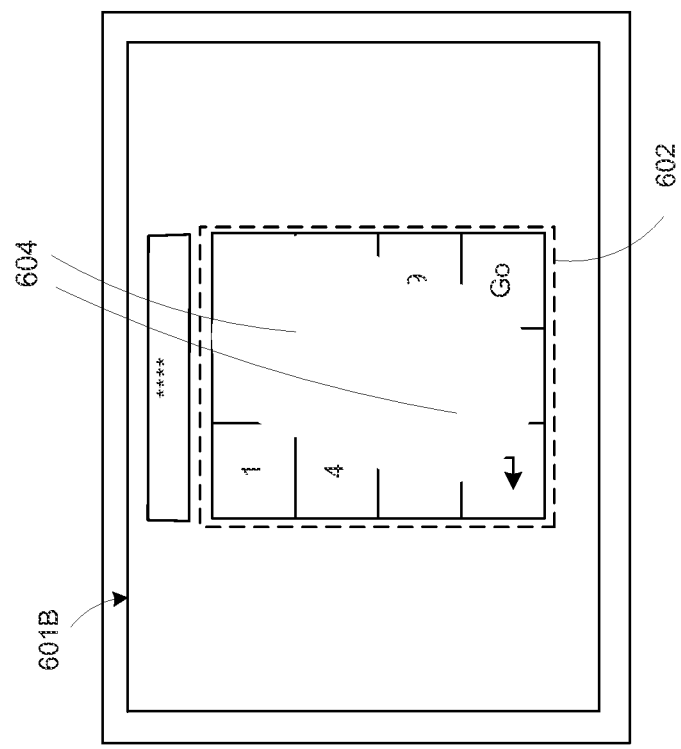
FIGS. 6A through 6B respectively illustrate another two examples of screenshots of an electronic device displaying a PIN entry interface.
Figure 6A:
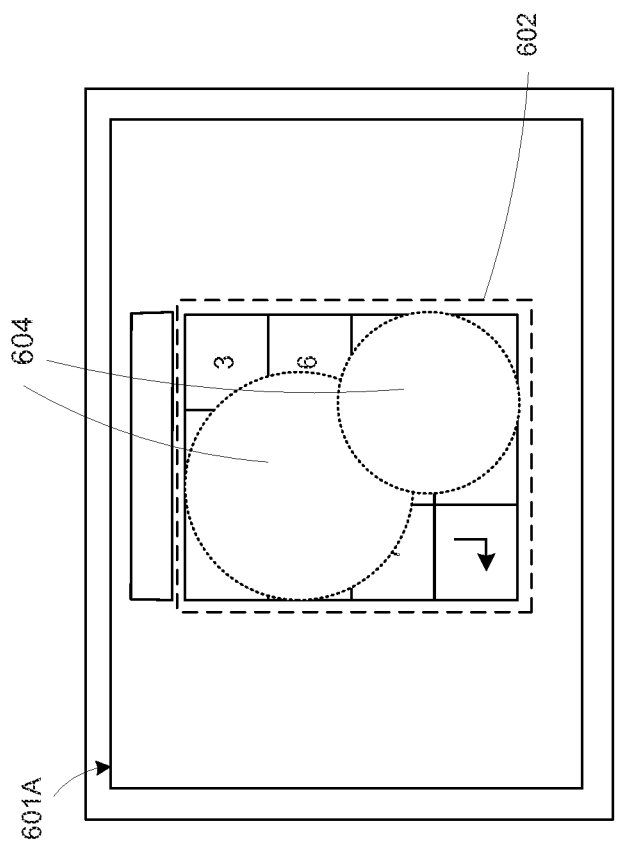

FIGS. 6A through 6B respectively illustrate another two example screenshots 601A through 601B of an electronic device displaying a PIN entry interface 602. As shown, instead of segmenting the PIN pad into pieces of images, additional or alternative embodiments of the secure display element module 319 can employ one or more geometric shapes as masks 604 to conceal the keys on the PIN pad. The geometric mask can be either two-dimensional or three-dimensional. Note that, the example circular shapes (as the masks 604) in screenshot 601A are illustrated as having dotted border lines for easier understanding; in one or more embodiments, the geometric shapes in the masks 604 do not have borders so that, when the plurality of images being sequentially displayed, it is less likely for a human user to perceive interfering lines flickering in the displayed PIN pad.

According to some embodiments, the secure display element module 319 can (in ways described above, e.g., by the image processing function loaded in the graphics accelerator 380) conceal different segments of the PIN pad by varying a location, a number, a size and/or a shape of the geometric shapes utilized in the masks 604. An example of such is shown in the screenshot 601B of in FIG. 6B, where the location and the size of the two circles are changed. Note that the circular shapes utilized in the masks 604 do not have the dotted border lines. Similar to the granularity discussed above, in order to maintain a minimum security level, the total area that the masks 604 blocks as compared to the total area of the PIN interface 602 should over a minimum threshold. This minimum threshold can be defined and/or configured in the secure display element 319.

In addition or as an alternative to changing the size, number, shape, and/or location of the geometric shapes in the masks 604, other visual properties of the geometric shapes in the masks 604 may be changed include, for example, opacity, optical refractivity (e.g., for a 3-D geometric object), brightness, texture, or depth. For example, in some embodiments, the PIN pad can be stored (e.g., as a unitary image) with a depth of X in a depth buffer (or a "z-buffer," which is coupled to the vertex shader 384 but not shown in in FIG. 3B for simplicity) of the graphics accelerator 380, and then the vertex shader 384 can be configured to vary the depth (between depth X+1 and X−1) of one or more of the geometric shapes included in the masks 604 to selectively block characters on the PIN pad. In variations, the vertex shader 384 can be configured to render an opaque or non-transparent surface at depth X−1 to cover the PIN pad, and move a location of a "pinhole," for example, on the opaque surface over various characters on the PIN pad to make those characters visible. Notably, the depth of the mask 604 (or the various geometric shapes included therein, respectively) is evaluated in relation to the depth of the PIN pad being displayed. As another variation, the vertex shader 384 can cause a three-dimensional opaque polygon to be rendered at the same depth as the keypad but rotate and/or relocate the three-dimensional polygon such that at least a portion of the keys is concealed at any instant of time.

It will be appreciated by a person having ordinary skill in the art that, through controlling the image processing function, the secure display element 319 can configure the graphics accelerator 380 to perform various tasks to disguise, mask, segment, or otherwise conceal the PIN pad. For example, the image generation or concealment techniques introduced here can be combined with other known techniques such as inserting different light effect filters, distorting or obscuring content (e.g., CAPTCHA-style distortion), varying light source, hue, contrast, rendered texture, shading techniques (e.g., Phong shading or flat shading) and/or other suitable lighting effects. However, also note that, in some preferred embodiments, the color of the geometric shapes that are used in the masks 604 are selected to be the same as the background color (e.g., white or non-transparent) as the PIN pad interface 602 so as to reduce the likelihood of the human user detecting discoloration of the PIN pad.

Additionally, a suitable combination of the above-mentioned generation of images and other known information display security skills such as distorting content of the sensitive information can increase the security level even further. For example, lighting effects may be added to the masks 604 such that at least some of the characters on the keypad are twisted, disguised, or altered to the extent that the characters on each image become unrecognizable by human and machine, and yet when the images being sequentially rendered, the images collectively show the characters being without substantially perceivable distortion or alteration.

FIGS. 7 through 8 respectively illustrate two additional example screenshots, each showing different techniques for an electronic device to securely display a PIN entry interface. In screenshot 701 of FIG. 7, the masks 704 conceal the digits of the keypad interface 702 by masking using three irregular shaped geometric shapes that are opaque. The three irregular shaped geometric shapes have dotted border lines for facilitating understanding; in practice, the shapes may not have visible border lines. As mentioned above, the secure display element 319 can adjust the location, size, number, and/or shape of the geometric shapes in the masks 704. The adjustment can automatically vary with time and be based (among other factors) on the size of the keypad area 702.

In screenshot 801 of FIG. 8, the masks 804 includes a rectangular shaped opaque object (or objects) that covers a majority portion of the digits on the keypad. However, in the embodiment of FIG. 8, the masks 804 further contains a bogus data 806 that is designed to confuse the unscrupulous person who is in control of the malware. The secure display element 319 can be configured to disguise or conceal different keys of the keypad by altering the digits of keypad. In some embodiments, the content alteration is such that, at a select number of instances in time, at least one different digit on the keypad is altered. In some variations, the content alteration is such that, at any instant in time, at least one different digit on the keypad is altered on all images. But, in similar fashions mentioned above, when the plurality of images are sequentially displayed at or above the minimum frame rate, the plurality of images are perceivable by a human user collectively as the piece of sensitive information without the content alteration. In the example screenshot 801, the digit on the key has been altered from "6" to "3" by the secure display element module 319.

Specifically, some embodiments of the secure display element module 319 can analyze the content of the keypad (or sensitive information) that is to be displayed. If the content of the keypad contains, for example, alphanumerical data, then the secure display element module 319 can selectively choose to show bogus data (or "noise") that includes characters that are fake. Overall, embodiments of secure display element module 319 that can perform bogus data insertion can alter the content (e.g., characters on the keypad) of what is to be displayed in the predetermined secure display area by changing the content with fake but analogous data of the same or similar content category (e.g., from alphabet "A" to "E," from Roman character "α" to "θ," or from number "6" to "3," etc.). In some implementations, the secure display element module 319 can choose the same or similar font, typeface, and style (e.g., other characters in the same font set) so that the bogus data can have same or similar appearance of true data. In some embodiments, typeface, font, or other calligraphic properties can be extracted from metadata, which, for example, may be received with the keypad or the sensitive information.

Two aspects in relation to this bogus data insertion technique that should be noted by the reader. First, in some embodiments, no conflicting bogus data is inserted for the same key or character during a predetermined period of time. For example, if the secure display element module 319 is to create 20 images for being sequentially displayed during 1 second (i.e., displaying the keypad at 20 images per second), and there has been at least one bogus data (e.g., the fake "3" key) to be inserted on one image (e.g., image 801) at a certain location (where the fake "3" is displayed), then the secure display element module 319 does not insert another conflicting bogus data (e.g., a fake "5" key) at the same location in the remaining 19 images (which are to be sequentially rendered during the 1 second). That is to say, in these embodiments, no two bogus data cover the same character in the plurality of images. In this fashion, the secure display element 319 can control the amount of bogus data inserted in each image so that no excessive overlapping of bogus data occurs, causing the user to perceive noise or flickering in the displayed digits. However, the inserted bogus data can still be changed as the time goes by to increase security. Also, in the embodiments where no conflicting bogus data is inserted for the same key or character during a predetermined period of time, the secure display element 319 still can insert another bogus data for another key or character (i.e., at a different location than the location that already contains bogus data insertion).

Further, the secure display element module 319 can control the ratio between the amount of the bogus data versus true data. This is similar to a signal-to-noise ratio control. Overall, the true data (i.e., "signal") should still be displayed more often than the bogus data (i.e., "noise") so that the true data will not be overwhelmed by the bogus data, or otherwise the human user may perceive the wrong data on the display screen. In some examples, this ratio between the amount of the bogus data versus true data is 1:5, which means that, for each image that contains a bogus data at one location, there are at least 5 additional images that contains the true data at the same location. In another implementation, the ratio is 1:2—an amount of the bogus data for a given character in the plurality of images is at or less than 50% of an amount of real data in the plurality of images for the given character. In addition, this bogus data insertion technique can be combined with aforementioned techniques (e.g., data masking) for enhanced security.

Figure 9:
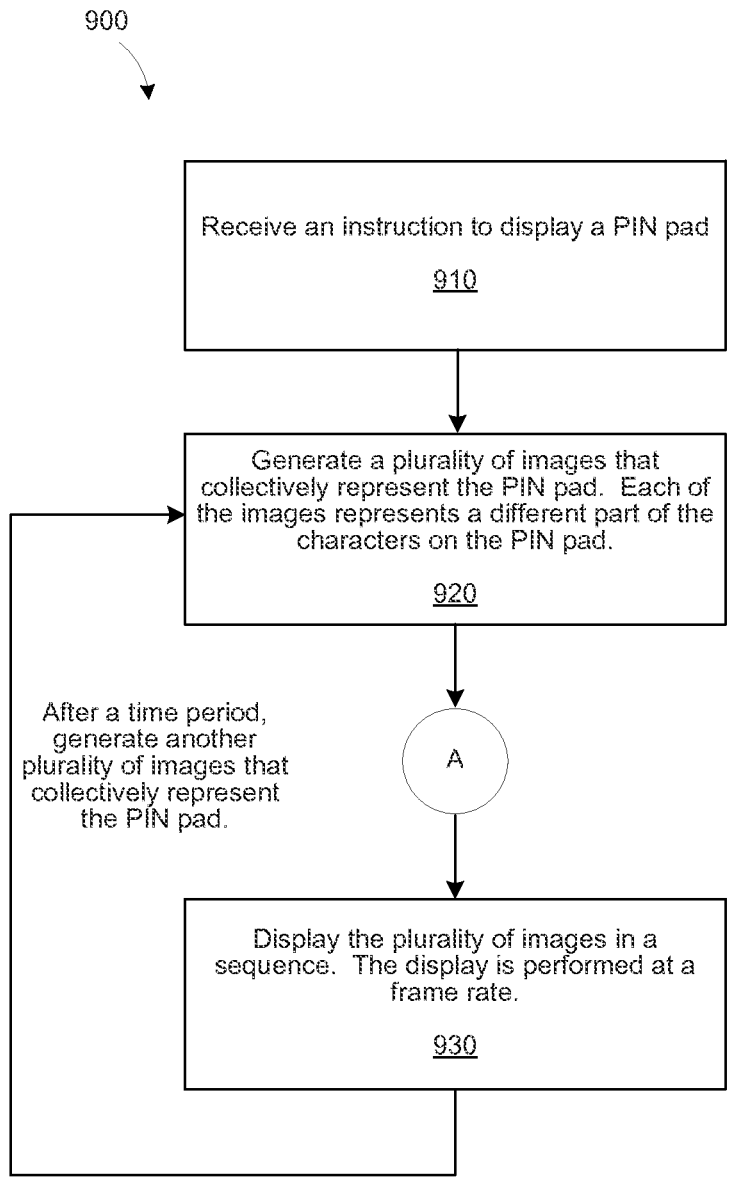
FIG. 9 is a flow diagram illustrating an example of a process for generating images for secure display elements.

FIG. 9 is a flow diagram illustrating an example of a process 900 for generating images for secure display elements. The process 900 can be performed by, for example, the secure display element module 319 in conjunction with the processing system 320 and the display/graphics subsystem 340 in generating the plurality of images for securely displaying the image to be secured (such as the PIN pad, for example). To facilitate description, the process 900 is explained below with reference to FIGS. 3A through 3B.

First, an instruction is received (910) to display an image to be secured, such as a keypad for PIN entry. The instruction can be received internally within the electronic device, such as from the application 318 to the interface module 315, or from the processing system 320 to the display/graphics subsystem 340 (or the graphics accelerator 380). The instruction can also be received externally, such as from the backend system 305 to the electronic device 302. Depending on the embodiment, the instruction can be received through the communications circuitry 350 and/or via an application programming interface (API)

In response to the instruction, the electronic device 302 generates (920) a plurality of images that each represent a different segment of the image to be secured (e.g., a different key of the PIN pad) in one or more ways introduced here. The plurality of images can collectively represent the image to be secured being statically displayed on the screen of the electronic device. In some embodiments, the generation of the images is performed by the secure display element module 319 issuing instructions (e.g., through the processing system 320) to the display/graphics subsystem 340. Each of the images represents a different part of the image to be secured, but the images collectively represent the image to be secured.

After the generation of the plurality of segmented images, the images are sequentially displayed (or rendered) (930) in the secured display area at at least a predetermined minimum frame rate, so that the image to be secured appears to be displayed to the human user as one substantially static image. The rendering of the plurality of images are performed such that not all of the plurality of images are displayed at any instant in time; however, because the plurality of images are displayed sequentially at or above the predetermined minimum frame rate, the plurality of images sequentially displayed are perceivable by the human user collectively as the image to be secured. Note that the sequence that the plurality of images are displayed need not be the sequence that each of the images is generated; the display sequence can be a random sequence. To further increase the security level, the image processing function (by which the security display element module 319 controls how the segments or the plurality of images are generated) can automatically vary over time.

Figure 10:
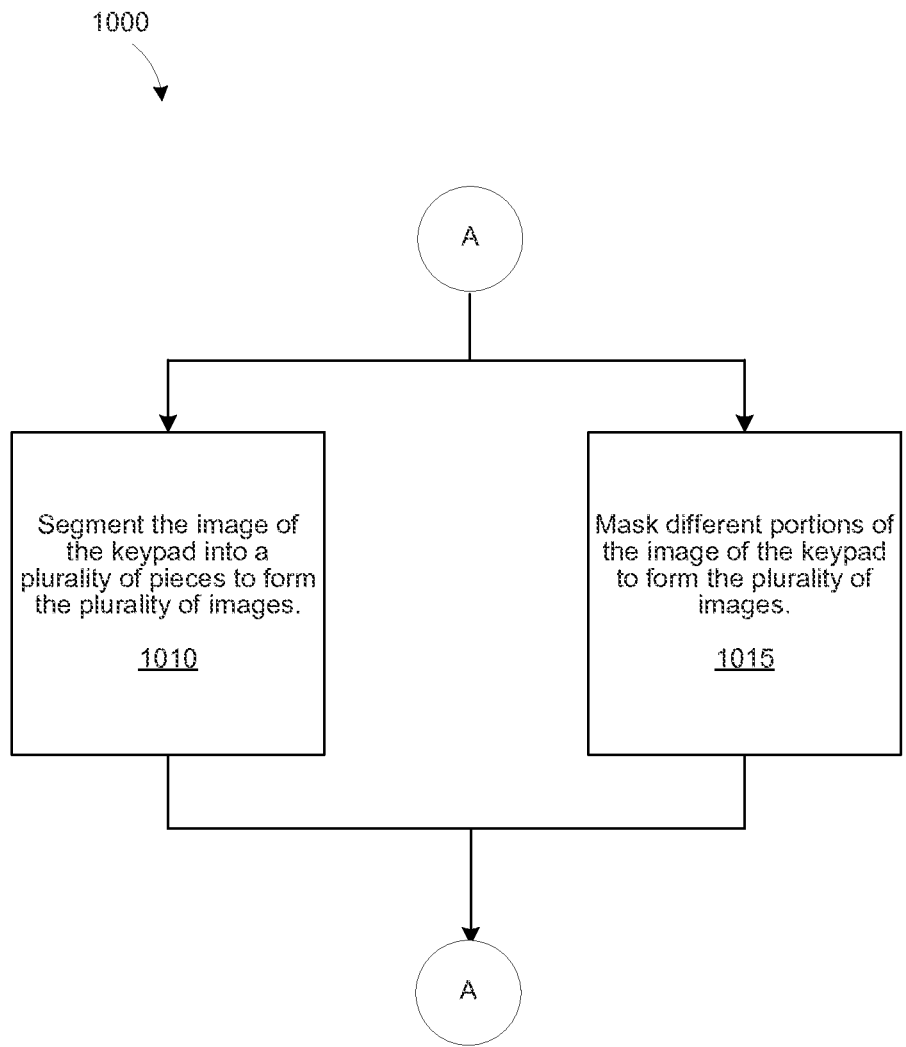
FIG. 10 is a flow diagram illustrating additional details of the process of FIG. 9 for generating images for secure display elements.

FIG. 10 is a flow diagram illustrating additional details of the example process 900 of FIG. 9 for generating images for secure display elements, and more specifically, for generating data operable to render a plurality of images that collectively represent the image to be secured. According to some embodiments, the plurality of images that each contain segmented information and collectively represent the image to be secured can be created from the secure display element module 319 separating or segmenting (1010) the image to be secured into a number of discrete images, similar to a process of a paper shredder. The segmentation can be random so that the resulting segments are not predictable. The shape of the segment can include, but not limited to, rectangular, parallelogram, lozenge, or random. The determination of the dimensions of each segment can take reference from numerous standards for the security levels of paper shredders, including German Institute for Standardization (DIN) 66399, for example.

As an alternative to separating the image to be secured, the secure display element module 319 can generate the plurality of images by masking (1015) different portions of the image to be secured each time the secure display module 319 creates an image in forming the plurality of images. For example, one or more geometric shapes can be employed as masks to conceal segments of the image to be secured (e.g., the keys on the keypad). The geometric mask can be either two-dimensional or three-dimensional. The secure display element module 319 can (e.g., by the image processing function loaded in the graphics accelerator 380) conceal different segments of the image to be secured by varying a location, a number, a size and/or a shape of the geometric shapes utilized in the masks. In addition or as an alternative, other visual properties of the geometric shapes in the masks may be changed.

Figure 11:
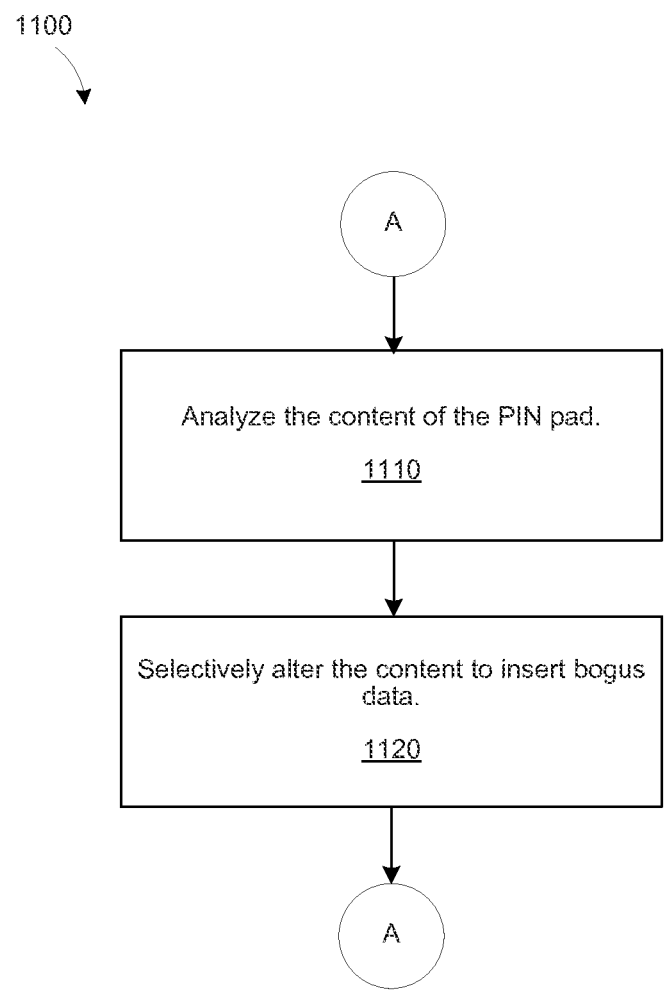
FIG. 11 is a flow diagram illustrating some alternative details of the process of FIG. 9 for further enhancing security in some embodiments.

FIG. 11 is a flow diagram illustrating some alternative details of the example process 900 of FIG. 9 for further enhancing security for some embodiments.

In accordance with some embodiments, the secure display element module 319 can analyze (1110) the content of the image to be secured (e.g., a keypad or other sensitive information) that is to be displayed. If the content of the image to be secured contains, for example, alphanumerical data, then the secure display element module 319 can selectively choose (1120) to show bogus data (or "noise") that includes characters that are fake. Overall, embodiments of secure display element module 319 that can perform bogus data insertion can alter the content (e.g., characters on the keypad) of what is to be displayed in the predetermined secure display area by changing the content with fake but analogous data of the same or similar category. In some implementations, the secure display element module 319 can choose the same or similar font, typeface, and style (e.g., other characters in the same font set) so that the bogus data can have same or similar appearance of true data.

Figure 12:
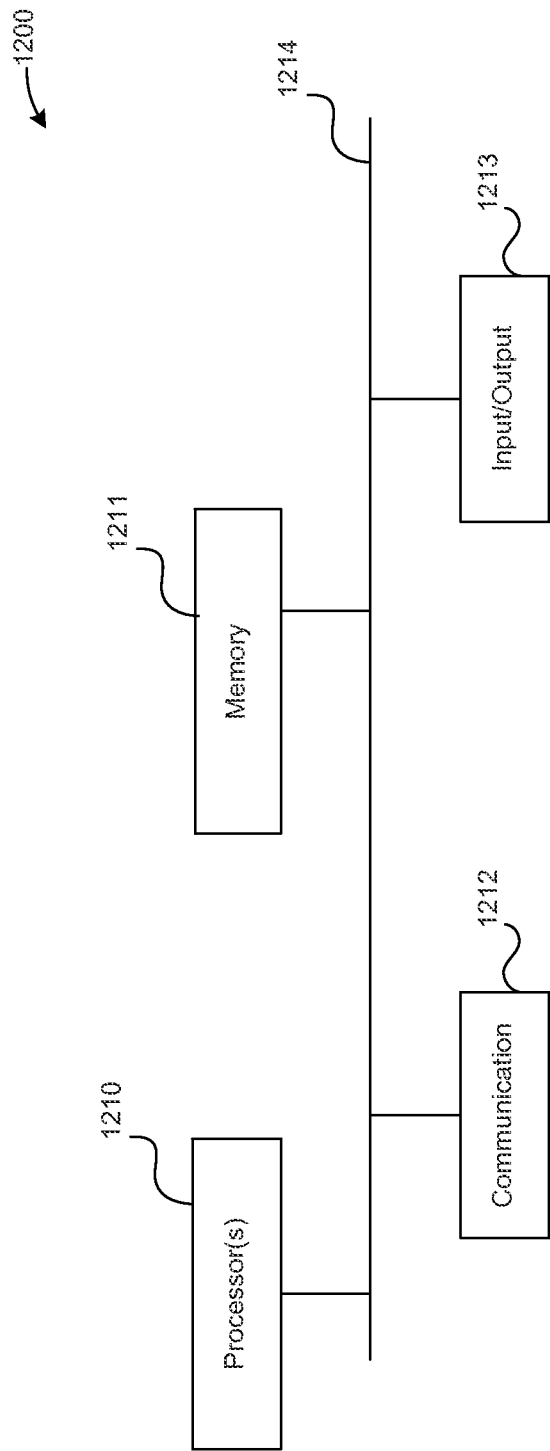
FIG. 12 is a high-level block diagram showing an example of a computing system in which at least some operations related to the techniques introduced here can be implemented.

FIG. 12 is a high-level block diagram showing an example of a processing device 1200 that can represent any of the devices described above, such as the mobile device 102, the merchant POS system 104, payment service system 108, acquirer system 114, card payment network 116, issuer system 118, or electronic devices 202, 302. As noted above, any of these systems may include two or more processing devices such as represented in FIG. 12, which may be coupled to each other via a network or multiple networks.

In the illustrated embodiment, the processing system 1200 includes one or more processors 1210, memory 1211, a communication device 1212, and one or more input/output (I/O) devices 1213, all coupled to each other through an interconnect 1214. The interconnect 1214 may be or include one or more conductive traces, buses, point-to-point connections, controllers, adapters and/or other conventional connection devices. The processor(s) 1210 may be or include, for example, one or more general-purpose programmable microprocessors, microcontrollers, application specific integrated circuits (ASICs), programmable gate arrays, or the like, or a combination of such devices. The processor(s) 1210 control the overall operation of the processing device 1200. Memory 1211 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 1211 may store data and instructions that configure the processor(s) 1210 to execute operations in accordance with the techniques described above. The communication device 1212 may be or include, for example, an Ethernet adapter, cable modem, Wi-Fi adapter, cellular transceiver, Bluetooth transceiver, or the like, or a combination thereof. Depending on the specific nature and purpose of the processing device 1200, the I/O devices 1213 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium can include recordable/non-recordable media (e.g., read-only memory (ROM), random access memory (RAM), magnetic disk storage media, optical storage media, flash memory devices, etc.).

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described. Accordingly, the specification and drawings are to be regarded in an illustrative sense rather than a restrictive sense.

What is claimed is:

1. A method for securely displaying sensitive information on a mobile computing device, the method comprising:
receiving, at the mobile computing device, an instruction to display a keypad in a predetermined display area of a display device of the mobile computing device to enable a human user of the mobile computing device to enter a personal identifier number (PIN) by use of the keypad, wherein the keypad includes a plurality of characters to enable a user to enter the PIN into the computing device via the keypad;
generating, by a processor of the mobile device, data operable to facilitate a plurality of images to be rendered, each image representing a different part of the plurality of characters, wherein the plurality of images collectively represent the keypad; and
causing the keypad to be displayed to the human user of the mobile computing device by rendering, using a graphics accelerator in the mobile computing device, the plurality of images in the predetermined display area sequentially at least at a predetermined minimum frame rate, such that not all of the plurality of images are displayed at any instant in time but where the predetermined minimum frame rate is such that the plurality of images sequentially displayed are perceivable by the human user collectively as the keypad,
wherein said generating comprises:
loading a shading function into a vertex shader of a graphics accelerator of the computing device such that, at any instant in time, at least a segment of the item of information is disguised or concealed; and
converting, by a rasterizer of the graphics accelerator of the computing device, outputs sourced from the vertex shader into pixel information that represents the plurality of images,
wherein the shading function disguises or conceals different segments of the items of information at different times.

2. The method of claim 1, wherein said generating comprises:
processing the keypad according to an image processing function to form the plurality of images such that each of the plurality of images has at least a part of the plurality of characters disguised or concealed to an extent that no single character of the keypad is recognizable from any single one of the plurality of images.

3. The method of claim 2, wherein the image processing function automatically varies over time and based on a computing performance of the computing device.

4. The method of claim 1, wherein said generating comprises:
loading a shading function into a vertex shader of a graphics accelerator of the mobile device such that, at any instant in time, at least one part of the characters of the keypad is disguised or concealed; and
converting, by a rasterizer of the graphics accelerator of the mobile device, outputs sourced from the vertex shader into pixel information that represents the plurality of images, and
wherein said causing comprises:
storing the pixel information into a frame buffer of the graphics accelerator of the mobile device.

5. A method for securely displaying information on a computing device, the method comprising:
detecting, in the computing device, an instruction to display an item of information to be secured;
generating, by the computing device, a plurality of images, each of which represents a different segment of the item of information, wherein the plurality of images collectively represent the item of information being statically displayed; and
displaying, on a display of the computing device, the plurality of images sequentially at least at a predetermined minimum frame rate,
wherein said generating comprises:
loading a shading function into a vertex shader of a graphics accelerator of the computing device such that, at any instant in time, at least a segment of the item of information is disguised or concealed; and
converting, by a rasterizer of the graphics accelerator of the computing device, outputs sourced from the vertex shader into pixel information that represents the plurality of images,
wherein the shading function disguises or conceals different segments of the item of information at different times.

6. The method of claim 5, wherein the plurality of images are displayed such that not all of the plurality of images are displayed at any instant in time but where the predetermined minimum frame rate is such that the plurality of images sequentially displayed are perceivable by a human user collectively as a single, static image showing the item of information.

7. The method of claim 5, wherein the plurality of images are displayed in a randomized sequence.

8. The method of claim 5, wherein the shading function disguises or conceals different segments of the item of information by varying a location, a shape, an opacity, an optical refractivity, a brightness, a texture, or a depth of a mask.

9. The method of claim 5, wherein the shading function disguises or conceals different segments of the item of information by varying hue or contrast of the different segments of the sensitive information.

10. The method of claim 5, wherein the shading function disguises or conceals different segments of the item of information by altering content of the item of information such that, at any instant of time, at least one different part of the content of the item of information is altered on any individual image but where the predetermined minimum frame rate is such that the plurality of images sequentially displayed are perceivable by a human user collectively as the item of information without alteration.

11. The method of claim 5, further comprising:
determining the predetermined minimum frame rate based on a computing performance of the computing device; and
dynamically adjusting a total number of the segments based on an updated computing performance of the computing device.

12. The method of claim 11, wherein said dynamically adjusting comprises:

detecting whether an effective minimum frame rate is reducing; and if the detected effective minimum frame rate is reducing, reducing the total number of the segments, but only to an extent that the total number of segments remains above a minimum threshold defined by a minimum security level.

13. The method of claim 5, wherein the instruction is received from a server remote from the computing device or from another software application via an application programming interface (API).

14. A computing device comprising:

a display;

communications circuitry configured to receive an instruction to display an item of information on the display;

a processor configured to generate a plurality of images, each of which represents a different segment of the item of information, wherein the plurality of images collectively represent the item of information being statically displayed; and a rendering pipeline coupled to the processor and configured to display, on the display, the plurality of images sequentially at least at a predetermined minimum frame rate, wherein said generating comprises:

loading a shading function into a vertex shader of a graphics accelerator of the computing device such that, at any instant in time, at least a segment of the item of information is disguised or concealed; and converting, by a rasterizer of the graphics accelerator of the computing device, outputs sourced from the vertex shader into pixel information that represents the plurality of images, wherein the shading function disguises or conceals different segments of the item of information at different times.

15. The device of claim 14, wherein the plurality of images are displayed such that not all of the plurality of images are displayed at any instant in time but where the predetermined minimum frame rate is such that the plurality of images sequentially displayed are perceivable by a human user collectively as the a single, static image showing the item of information.

16. The device of claim 14, wherein the rendering pipeline comprises:

a vertex shader configured to disguise or conceal at least a segment of the item of information at any instant in time; and a rasterizer configured to convert outputs sourced from the vertex shader into pixel information that represents the plurality of images.

17. The device of claim 16, wherein the item of information is disguised or concealed to an extent that no single character on the item of information is recognizable from any single one of the plurality of images.

18. The device of claim 14, wherein the processor is further configured to:

determine the predetermined minimum frame rate based on a computing performance of the computing device; and dynamically adjust a total number of the segments based on an updated computing performance of the computing device.

19. A non-transitory computer readable medium storing instructions for securely displaying information on a computing device, the instructions, when executed by a processor of the computing device, cause the computing device to perform a method comprising:

detecting, in the computing device, an instruction to display an item of information to be secured;

generating, by the computing device, a plurality of images, each of which represents a different segment of the item of information, wherein the plurality of images collectively represent the item of information being statically displayed; and displaying, on a display of the computing device, the plurality of images sequentially at least at a predetermined minimum frame rate, wherein said generating comprises:

loading a shading function into a vertex shader of a graphics accelerator of the computing device such that, at any instant in time, at least a segment of the item of information is disguised or concealed; and converting, by a rasterizer of the graphics accelerator of the computing device, outputs sourced from the vertex shader into pixel information that represents the plurality of images, wherein the shading function disguises or conceals different segments of the item of information at different times.

20. The medium of claim 19, wherein the plurality of images are displayed such that not all of the plurality of images are displayed at any instant in time but where the predetermined minimum frame rate is such that the plurality of images sequentially displayed are perceivable by a human user collectively as a single, static image showing the item of information.

21. The medium of claim 19, wherein the plurality of images are displayed in a randomized sequence.

22. The medium of claim 19, wherein the shading function disguises or conceals different segments of the item of information by varying a location, a shape, an opacity, an optical refractivity, a brightness, a texture, or a depth of a mask.

23. The medium of claim 19, wherein the shading function disguises or conceals different segments of the item of information by varying hue or contrast of the different segments of the sensitive information.

24. The medium of claim 19, wherein the shading function disguises or conceals different segments of the item of information by altering content of the item of information such that, at any instant of time, at least one different part of the content of the item of information is altered on any individual image but where the predetermined minimum frame rate is such that the plurality of images sequentially displayed are perceivable by a human user collectively as the item of information without alteration.

25. The medium of claim 19, the method further comprising:

determining the predetermined minimum frame rate based on a computing performance of the computing device; and dynamically adjusting a total number of the segments based on an updated computing performance of the computing device.

26. The medium of claim 25, wherein said dynamically adjusting comprises:

detecting whether an effective minimum frame rate is reducing; and if the detected effective minimum frame rate is reducing, reducing the total number of the segments, but only to an extent that the total number of segments remains above a minimum threshold defined by a minimum security level.

27. The medium of claim 19, wherein the instruction is received from a server remote from the computing device or from another software application via an application programming interface (API).

28. A computing system comprising:
communications circuitry configured to receive an instruction to display an item of information;
a processor configured to generate a plurality of images, each of which represents a different segment of the item of information, wherein the plurality of images collectively represent the item of information being statically displayed; and
a rendering pipeline coupled to the processor and configured to display the plurality of images sequentially at least at a predetermined minimum frame rate,
wherein said generating comprises:
loading a shading function into a vertex shader of a graphics accelerator such that, at any instant in time, at least a segment of the item of information is disguised or concealed; and
converting, by a rasterizer of the graphics accelerator, outputs sourced from the vertex shader into pixel information that represents the plurality of images,
wherein the shading function disguises or conceals different segments of the item of information at different times.

* * * * *